US009673681B2

(12) United States Patent
Hopper et al.

(10) Patent No.: US 9,673,681 B2
(45) Date of Patent: *Jun. 6, 2017

(54) METHODS AND SYSTEMS FOR POWER GENERATION BY CHANGING DENSITY OF A FLUID

(71) Applicant: Hopper Energy Systems, Inc., Naples, FL (US)

(72) Inventors: Leon Hopper, Riverview, FL (US); Jeffrey Barnett, Naples, FL (US); Stephen Dorozenski, Naples, FL (US)

(73) Assignee: Hopper Energy Systems, Inc., Naples, FL (US)

( * ) Notice: Subject to any disclaimer, the term of this patent is extended or adjusted under 35 U.S.C. 154(b) by 456 days.

This patent is subject to a terminal disclaimer.

(21) Appl. No.: 13/795,177

(22) Filed: Mar. 12, 2013

(65) Prior Publication Data
US 2013/0200635 A1    Aug. 8, 2013

Related U.S. Application Data

(63) Continuation-in-part of application No. 13/311,395, filed on Dec. 5, 2011, now Pat. No. 8,667,798, and a (Continued)

(51) Int. Cl.
*F03B 17/02* (2006.01)
*H02K 7/18* (2006.01)
(Continued)

(52) U.S. Cl.
CPC .............. *H02K 7/18* (2013.01); *A01G 33/00* (2013.01); *F03B 17/02* (2013.01); *H02K 35/02* (2013.01);
(Continued)

(58) Field of Classification Search
CPC .................................. F03B 17/02; F03C 1/00
(Continued)

(56) References Cited

U.S. PATENT DOCUMENTS 2,942,411 A * 6/1960 Hutchings ............... F01K 3/006
126/643
3,934,964 A * 1/1976 Diamond ................ F03B 17/04
415/5

(Continued)

FOREIGN PATENT DOCUMENTS

EP        1566542 A1      8/2005
GB        2460114 A  *  11/2009  ............. A01G 33/00
(Continued)

OTHER PUBLICATIONS

Canadian Patent Office Examination Report, Canadian Patent Office, Mar. 7, 2014, 4 pages.
(Continued)

*Primary Examiner* — Thai Ba Trieu
*Assistant Examiner* — Shafiq Mian
(74) *Attorney, Agent, or Firm* — NK Patent Law, PLLC

(57) ABSTRACT

A density engine includes an object movably positioned in a host liquid, the object having a density less than that of host liquid. An injector injects gas below the object creating a rising fluid region having a density less than that of the object. The object is not buoyant in the rising fluid region. An electrical generator is coupled to the object to generate electrical energy upon movement of the object. A biofuel production facility receives gas from the density engine and produces a biofuel through a biological process of a living organism that utilizes the gas. A consolidated energy production and storage system includes a gas sequestration facility, a density engine, and a biofuel production facility (Continued)

located together on a contiguous plot of land. Windmills and solar collectors may be located on the plot of land.

16 Claims, 16 Drawing Sheets

Related U.S. Application Data continuation-in-part of application No. 12/980,782, filed on Dec. 29, 2010, now abandoned.

(60) Provisional application No. 61/290,663, filed on Dec. 29, 2009, provisional application No. 61/290,671, filed on Dec. 29, 2009, provisional application No. 61/393,211, filed on Oct. 14, 2010.

(51) Int. Cl.
*H02K 35/02* (2006.01)
*H02K 35/04* (2006.01)
*A01G 33/00* (2006.01)

(52) U.S. Cl.
CPC .............. *H02K 35/04* (2013.01); *Y02E 10/20* (2013.01); *Y02P 60/12* (2015.11)

(58) Field of Classification Search
USPC .......................................... 60/495, 496, 649
See application file for complete search history.

(56) References Cited

U.S. PATENT DOCUMENTS

| | | | | |
|---|---|---|---|---|
| 4,054,031 A * | 10/1977 | Johnson | ................... | F03B 17/02 415/7 |
| 4,084,375 A * | 4/1978 | Horvath | ................... | F03B 17/02 60/496 |
| 4,196,590 A * | 4/1980 | Fries | ................... | 60/496 |
| 4,385,497 A * | 5/1983 | Scott | ................... | F03B 7/003 415/916 |
| 4,698,516 A * | 10/1987 | Thompson | ................... | F03B 13/06 290/54 |
| 4,718,232 A * | 1/1988 | Willmouth | ................... | F03B 17/04 290/1 R |
| 5,555,728 A * | 9/1996 | Welch, Jr. | ................... | F01D 23/00 60/496 |
| 8,171,729 B2 * | 5/2012 | O'Briant | ................... | F03B 17/04 290/1 R |
| 8,453,442 B1 * | 6/2013 | Tran | ................... | F03B 17/02 60/495 |
| 2003/0145589 A1 * | 8/2003 | Tillyer | ................... | F03B 17/02 60/496 |
| 2005/0271914 A1 * | 12/2005 | Farooque et al. | ................... | 429/19 |
| 2006/0064975 A1 * | 3/2006 | Takeuchi | ................... | F03B 17/02 60/495 |
| 2007/0271912 A1 * | 11/2007 | Peacock | ................... | F03B 17/02 60/398 |
| 2009/0200026 A1 * | 8/2009 | Turta et al. | ................... | 166/268 |
| 2009/0255181 A1 * | 10/2009 | Rhinesmith | ................... | B01J 8/0207 48/127.9 |
| 2009/0289227 A1 * | 11/2009 | Rising | ................... | B01D 53/1475 252/373 |
| 2009/0309373 A1 * | 12/2009 | O'Briant | ................... | F03B 17/04 290/1 R |
| 2010/0024413 A1 * | 2/2010 | Kim | ................... | F03B 17/02 60/496 |
| 2010/0139536 A1 * | 6/2010 | Woodhouse | ................... | B01D 53/1475 110/345 |
| 2010/0187833 A1 * | 7/2010 | Pirincci | ................... | H02K 53/00 290/1 R |
| 2010/0223922 A1 * | 9/2010 | McGahee | ................... | F03B 17/04 60/495 |
| 2011/0061383 A1 * | 3/2011 | McAlister | ................... | F03G 6/00 60/641.7 |
| 2011/0156407 A1 * | 6/2011 | Dorozenski et al. | ................... | 290/1 R |
| 2011/0162356 A1 * | 7/2011 | Hastings | ................... | F03B 17/04 60/495 |
| 2011/0174401 A1 * | 7/2011 | Stevens et al. | ................... | 137/565.17 |
| 2011/0200520 A1 * | 8/2011 | Ramkumar et al. | ................... | 423/656 |
| 2012/0240832 A1 * | 9/2012 | Hiatt | ................... | F23G 5/02 110/341 |

FOREIGN PATENT DOCUMENTS

| | | |
|---|---|---|
| JP | 775395 A | 3/1995 |
| JP | 7103127 A | 4/1995 |
| JP | 1162808 A | 3/1999 |
| WO | 9636810 A1 | 11/1996 |
| WO | 2008082221 A1 | 7/2008 |
| WO | 2008110646 A1 | 9/2008 |
| WO | WO 2010045232 A4 * | 9/2010 ................. 423/656 |

OTHER PUBLICATIONS

European Search Report dated Apr. 12, 2013, for related application EP10844281.5.
Australian Patent Office Examination Report dated Aug. 7, 2013.
Korean Patent Office Examination Report dated Oct. 15, 2013.
Chinese Intellectual Property Office, Notification of the Second Office Action dated Mar. 11, 2015.
Japanese Patent Office Examination Report for Japanese Application No. 2012-547258 dated Sep. 22, 2014.
SIPO Office Action issued Jul. 31, 2014 for China patent application No. 201080060194.4.
Korean Patent Office Notice of Final Rejection, Korean Patent Office, Feb. 27, 2014, 2 pages.
European Notice of Grant, European Patent Office, Rijswijk, Netherlands, Feb. 21, 2014, 7 pages.
"Patent Examination Report No. 2," Australian Government, IP Australia, Nov. 18, 2013, 4 pages.

* cited by examiner

METHODS AND SYSTEMS FOR POWER GENERATION BY CHANGING DENSITY OF A FLUID

This application claims priority to U.S. Provisional Patent Application No. 61/290,663 filed on Dec. 29, 2009, U.S. Provisional Patent Application No. 61/290,671 filed on Dec. 29, 2009, and U.S. Provisional Patent Application No. 61/393,211 filed on Oct. 14, 2010, and U.S. Utility patent application Ser. No. 12/980,782 filed on Dec. 10, 2010, and U.S. Utility patent application Ser. No. 13/311,395 filed on Dec. 5, 2011, the contents of all of which are hereby incorporated by reference in their entirety.

TECHNICAL FIELD

The subject matter disclosed herein relates to methods and systems of electrical power generation. More specifically, the subject matter disclosed herein relates to power-generating systems and methods based on density changes within fluids utilizing a gas to change the density of the fluid.

BACKGROUND

New methods of producing electrical power are necessary for ecological, economic, and political reasons. Various renewable energy technologies such as wind, solar, and tidal have not been the answer to the world's current energy challenges as many of these technologies have inherent disadvantages. Current forms of energy production that use fossil fuels have well-documented limitations, including finite supplies and the release of green house gasses that impact the environment.

Non-fossil fuel source energy production technologies such as nuclear, geothermal, and hydrodynamic also have limitations such as where those technologies can be physically located, high capital investment costs, and negative environmental impacts.

It is known that mechanical energy from the motion of one of the forms of matter (solid, liquid, gas, or plasma) can be converted into electrical energy through an appropriate manner, such as a generator or magnetic induction system. The source mechanical energy is typically derived from 1) the conversion of the chemical energy in naturally occurring fossil fuels or manmade biofuels via combustion, 2) heat derived from nuclear reaction processes, or 3) the natural motion of water due to gravity, waves, or tidal forces.

Examples of commonly known energy production sources include fossil fuels such as coal, oil, natural gas, and shale, manmade biofuels, hydrodynamic dams including tidal designs, solar, wind, geothermal, and nuclear sources.

Many manufacturing and other industrial processes have by-products that have potential for conversion into energy. For example, wood is a by-product in many manufacturing processes and could be used to then heat a boiler or the like for producing HVAC services or electricity. Various other processes may have other waste products, such as exhaust gases, that may be converted into a useable energy.

In sum, each of these methods of energy production has various advantages and disadvantages. Accordingly a manner of energy production that addresses these disadvantages, while maintaining the advantages associated therewith, is desired.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Disclosed herein is an apparatus that includes an object for being placed in a fluid having a first density. An energy generator is coupled to the object and configured for generating energy upon translation of the object. A gas injector is provided for injecting gases into the fluid to lower the density thereof to a second density that is less than the density of the object and thereby induce buoyancy-dependent translation of the object to generate energy by the energy generator.

According to another embodiment, an apparatus is provided that includes an object coupled to a pivot and configured for being placed in a fluid. An electrical generator is coupled to the object and configured for generating electricity upon pivoting translation of the object about the pivot. A gas injector is provided for injecting gases into the fluid to lower the density thereof to less than the density of the object and thereby induce pivoting translation of the object about the pivot to generate electricity by the electrical generator.

According to another embodiment, an apparatus is provided. The apparatus includes a first object coupled to a pivot and configured for being placed in a first portion of fluid. A second object is coupled to the pivot and configured for being placed in a second portion of fluid. The second object is coupled to the first object such that movement of the first object imparts a corresponding movement to the second object. An electrical generator is coupled to the pivot and configured for generating electricity upon pivoting translation of the first object and second object about the pivot. A gas injector is in communication with the first portion of fluid for injecting gases into the first portion of fluid to lower the density thereof to less than the density of the first object and thereby induce pivoting translation of the first object about the pivot to generate electricity by the electrical generator.

According to another embodiment, an apparatus is provided and includes a first object coupled to a pivot and configured for being placed in a fluid. An electrical generator is coupled to the pivot and configured for generating electricity upon pivoting translation of the first object about the pivot. A gas injector is provided in communication with the fluid for injecting gases therein to lower the density thereof to less than the density of the first object and thereby induce pivoting translation of the first object about the pivot to generate electricity by the electrical generator.

According to another embodiment, an apparatus is provided. The apparatus includes a chamber for containing a fluid and an object for being placed in the fluid. An electrical generator is configured for generating electricity upon translation of the object. A gas injector is provided in communication with the chamber for injecting gases into the fluid to lower the density thereof to less than the density of the object to thereby induce buoyancy-dependent translation of the object to generate electricity by the electrical generator.

According to another embodiment, a method for generating energy is provided. The method includes providing an object in a fluid having a first density. The object is in engagement with an energy generator configured for generating energy upon translation of the object. The method also includes reducing the density of the fluid in order to impart buoyancy-dependent translation of the object in the fluid and generate energy by the energy generator and capturing energy generated by the energy generator.

According to another embodiment, a method of generating energy is provided. The method includes providing a first object in a first portion of fluid having a first density, injecting low-density fluids into the first portion of fluid in order to reduce the density thereof to less than the density of the first object and thereby induce buoyancy-dependent translation of the first object in response thereto, and generating energy based upon buoyancy-dependent translation of the first object.

According to another embodiment, placing a first object in a first portion of fluid includes placing the first object in a first position in the first portion of the fluid. According to another embodiment, injecting low-density fluids into the first portion of the fluid includes injecting low-density fluids to induce buoyancy-dependent translation of the first object into a second position in the first portion of the fluid. According to another embodiment, the method may further include allowing the density of the first portion of fluid to return to the first density to thereby induce buoyancy-dependent translation of the first object from the second position to the first position, and further including generating energy upon translation of the first object from the second position to the first position.

According to at least one particular exemplary embodiment, a density engine includes a chamber containing a host liquid having a first density, an object movably positioned in the host liquid and having a second density less than the first density such that the object is buoyant in the host liquid, an injector, and an electrical generator. The injector injects gas into the chamber below the object thereby creating a rising fluid region including the gas and the host liquid, the fluid region having a third density that is less than the second density such that the object is not buoyant in the rising fluid region. The electrical generator is coupled to the object to generate electrical energy upon movement of the object at least as the rising fluid region passes the object.

In at least one example, the density engine includes multiple objects at respective vertical positions within the host liquid, each movably positioned and each having a density less than the first density and greater than the second density.

In at least one example, the injector injects bursts of gas into the chamber intermittently thereby intermittently creating rising fluid regions having densities less than the second density, the rising fluid regions intermittently passing the object thereby causing oscillatory motion of the object.

In at least one example, a subterranean gas sequestration facility is in fluid communication with the injector to provide gas for injection. A fuel combustion facility provides the gas to the subterranean gas sequestration facility.

In at least one example, the density engine includes a collector in fluid communication with the chamber to receive gas emanating from a top surface of the host liquid after the gas rises through the host liquid. A subterranean gas sequestration facility in fluid communication with the collector sequesters gas received by the collector.

In at least one example, the density engine includes a collector in fluid communication with the chamber to receive gas emanating from a top surface of the host liquid, and a biofuel production facility is in fluid communication with the collector to receive the gas and to produce a biofuel through a biological process of a living organism that utilizes the gas. In at least one example, the biological process includes algae growth and the gas includes carbon dioxide.

According to at least one other particular exemplary embodiment, a consolidated energy and biofuel production system includes a biofuel production facility that receives a gas and produces a biofuel through a biological process of a living organism that utilizes the gas, and a density engine providing the gas to the biofuel production facility. The density engine includes a chamber containing a host liquid having a first density, an object movably positioned in the host liquid and having a second density less than the first density such that the object is buoyant in the host liquid, an injector, and an electrical generator. The injector injects gas into the chamber below the object thereby creating a rising fluid region including the gas and the host liquid, the fluid region having a third density that is less than the second density such that the object is not buoyant in the rising fluid region. The electrical generator is coupled to the object to generate electrical energy upon movement of the object at least as the rising fluid region passes the object.

In at least one example, the consolidated energy and biofuel production system includes a fuel combustion facility that provides the gas to the density engine. For example, the gas may include carbon dioxide, and the biological process may include algae growth.

In at least one example, the consolidated energy and biofuel production system includes a subterranean gas sequestration facility through which the fuel combustion facility provides the gas to the density engine. The sequestration facility may include a subterranean porous earth or rock layer.

In at least one example, the consolidated energy and biofuel production system includes a collector in fluid communication with the chamber, the collector configured to receive the gas from the density engine after the gas rises through the host liquid, and a sequestration facility in fluid communication with the collector, the sequestration facility configured to store the gas from the collector.

In at least one example, the density engine power production facility and the biofuel production facility are located together on a contiguous plot of land. A subterranean gas sequestration facility may be located below the contiguous plot of land. A windmill and a solar collector may be located on the contiguous plot of land as well.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings.

DETAILED DESCRIPTION

The presently disclosed invention is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
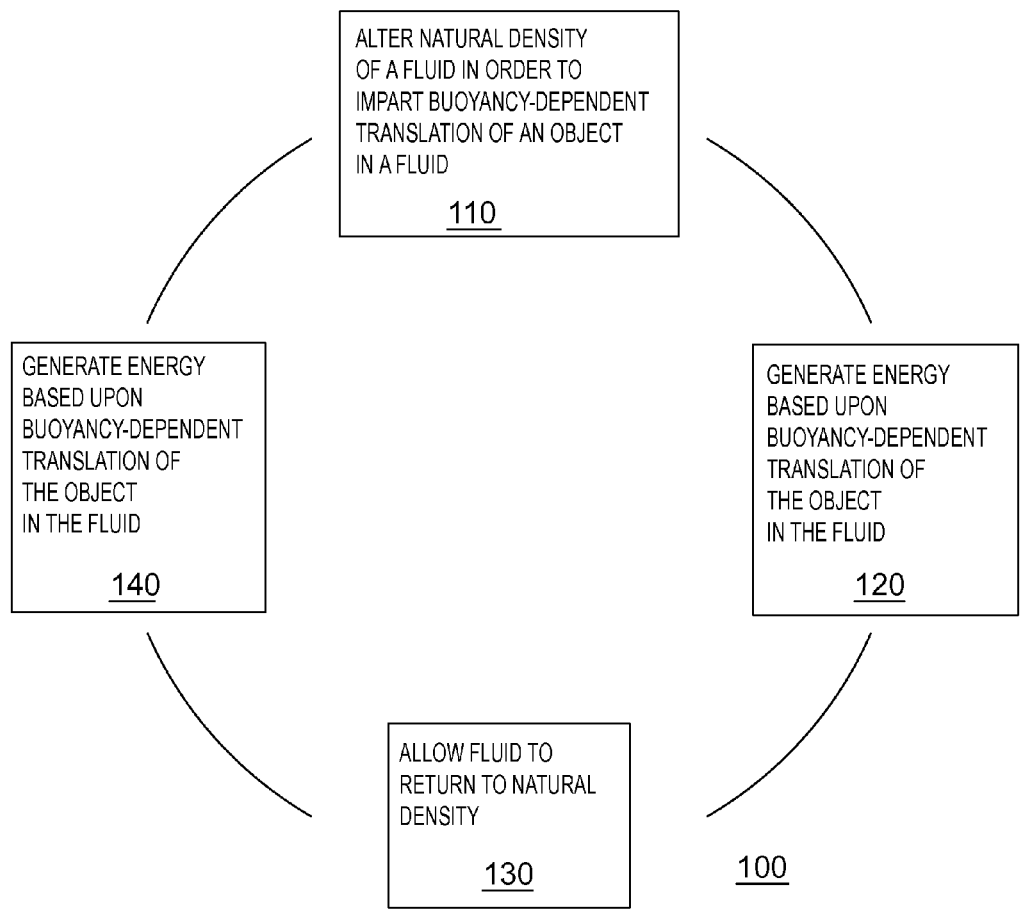
FIG. 1 depicts a flow chart illustrating one or more steps that may be performed according to a method disclosed herein.

Methods, apparatuses, and systems for converting buoyancy-dependent translation into energy are provided herein. In one or more embodiments, the methods, apparatuses, and systems of the presently disclosed subject matter are provided for converting buoyancy-dependent translation of an object positioned within a fluid into energy. A flow chart depicting one or more steps of the methods of converting buoyancy-dependent translation of an object into energy 100 is presented in FIG. 1. The method 100 includes altering the density of a fluid in order to impart buoyancy-dependent translation of an object in the fluid 110 in which the density of the fluid is altered to be less than the density of the object such that the object begins to translate in a generally downward direction. The object could be a first of many objects or a stand-alone object and could be placed in a first portion of a fluid. Implementation of the methods disclosed herein will be discussed in regards to various systems and apparatuses also disclosed herein, in which reference may be made to low-density fluid injection as one manner of altering the density of a liquid in order to impart buoyancy-dependent translation of an object. Injection of low-density fluids into a first portion of the fluid is one example of a manner of altering the density of a liquid, but other methods and manners are equally applicable and intended to be incorporated with the various systems and apparatuses disclosed herein. For example, altering the density of a liquid may include imparting a temperature change to a portion of fluid, injection of solid or semi-solid matter into a fluid, or imparting vibrational movement to a portion of fluid.

Energy is then generated based upon the buoyancy-dependent translation of the object in the fluid 120. The density of the fluid is then allowed to return to the natural density thereof 130. This return to natural density may be effectuated by, for example, the escape of low-density fluid bubbles such as gaseous bubbles into the surrounding environment or may be effectuated in response to some action by another system or apparatus. Energy may then be generated based upon the buoyancy-dependent translation of the object as the fluid returns to normal density 140. In this manner, the object may have a first position in which the object is suspended, emulsed, or floating within the fluid, and a second position which generally corresponds to the position of the object after the step of altering the natural density of a fluid in order to impart buoyancy-dependent translation of an object in a fluid 110. In the step generally corresponding to allowing the fluid to return to natural density 130 and generating energy based upon buoyancy-dependent translation of the object in the fluid 140, the object returns to the first position. As described herein, altering the natural density of a fluid may include reducing the density by injecting a low-density fluid into the fluid, or may, in alternate embodiments, include providing ultrasonic or other vibratory methods of creating low-density fluid voids within the fluid for reducing the density thereof. Still in other embodiments, this may be effectuated by harnessing natural gas expulsions from a natural source, such as an ocean floor. Each of those manners of reducing the density of the fluid in which the object is placed may be used in conjunction with any of the systems or apparatuses disclosed herein. These embodiments are provided as non-limiting examples, though it is envisioned that other manners of effectuating the same are encompassed within this description.

The term "object" is meant to include, but not be limited to, a single object, a plurality of objects, a device, or a plurality of devices moving through a fluid as described below. The movement of an object is also meant to include, but not be limited to, embodiments where the fluid and container holding the fluid are fixed, for example, fastened to a surface, and the object moves through the surrounding fluid, and embodiments where the object passing through the surrounding fluid in the previous embodiment is fixed, for example, fastened to a surface, and the fluid and container move around the object. For purposes of non-limiting description and illustration, embodiments described herein will describe embodiments where an object passes through a fluid held in a container.

It should be understood to those of skill in the art that embodiments are envisioned where the natural density of the object is less than or equal to the natural density of the surrounding fluid, and also embodiments where the natural density of the object is greater than the natural density of the surrounding fluid. For purposes of non-limiting description and illustration, the embodiments described herein will assume the object has a natural density less than or equal to the surrounding fluid.

In addition to varying the density of the surrounding fluid, the density of an object moving through the fluid can be varied to create a difference in the relative densities of the fluid and object. By way of non-limiting examples, a gas or other fluid can be injected into the interior of the object to increase its buoyancy, or non-gaseous matter (e.g. the surrounding fluid) can fill the interior of the object to decrease its buoyancy. In certain embodiments, the natural density of the fluid may be greater than the object, and in other embodiments the initial density of the fluid may be less than the object. In some embodiments, creating the largest density difference is advantageous as it creates the largest potential energy possible, and subsequently the largest kinetic energy possible when the subject matter disclosed herein is practiced. By varying the relative density of the object and surrounding fluid such that the density of the object is alternately less than and greater than the fluid, a cyclical pattern of motion of the object through the surrounding fluid is created. Appropriate suitable processes and/or systems can then be used to convert the kinetic energy of the object into electricity.

Figure 2:
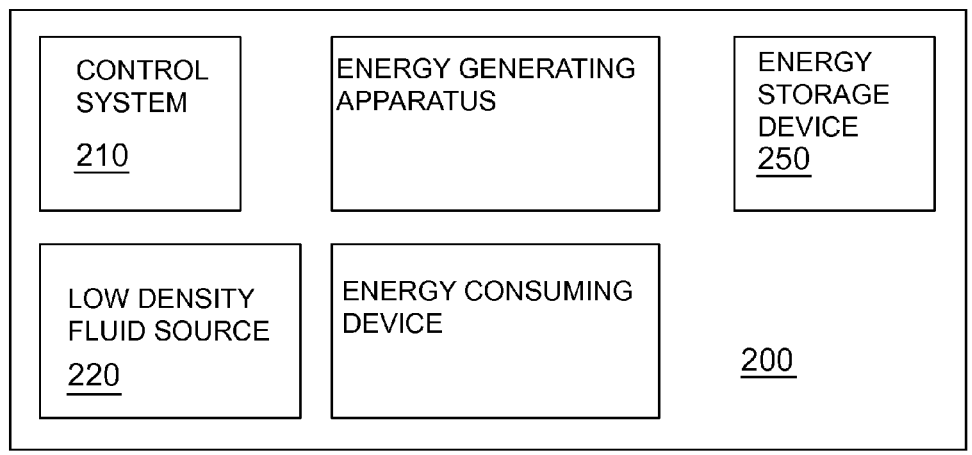
FIG. 2 depicts a schematic diagram of a system for generating energy according to one or more embodiments of the present invention.

A system for converting buoyancy-dependent translation of an object into energy is depicted in FIG. 2. The system 200 may generally include a control system 210 that is configured for dispensing a low-density fluid source 220. An energy generating apparatus is in communication with the control system 210 and the low-density fluid source 220. Various embodiments of the energy generating apparatus are depicted throughout the drawings. An energy consuming device or system may also be in communication with the energy generating apparatus for consuming energy generated thereby. Additionally, an energy storage device 250 may be provided for storing energy generated by the energy generating apparatus. The energy storage device 250 may be provided for any suitable form of energy storage, and may include battery cells or other chemical storage devices, electrical capacitors, supercapacitors, or magnetic energy storage, mechanical manners, thermal, or the like.

The methods, apparatuses, and systems of the presently disclosed subject matter are configured for use with the low-density fluid source 220, which may, in one or more embodiments, be a fluid source from a manufacturing or industrial facility. These facilities could include any facility that outputs some low-density fluid as a by-product. Examples of low-density fluids may include exhaust gases such as carbon dioxide that are exhausted from various industrial processes, or low-density fluids such as hot water. As used herein, "low-density" refers to a fluid having a density that is lower than the density of a body of fluid in which an object is placed in for use with any one of the energy generating apparatuses. While any appropriate fluid such as gas or a mixture of gases may be used, examples of gases that may be utilized include carbon dioxide, air, nitrogen, and gaseous products resulting from the combustion of fossil fuels, biofuels, or other carbon containing material.

Figure 3:
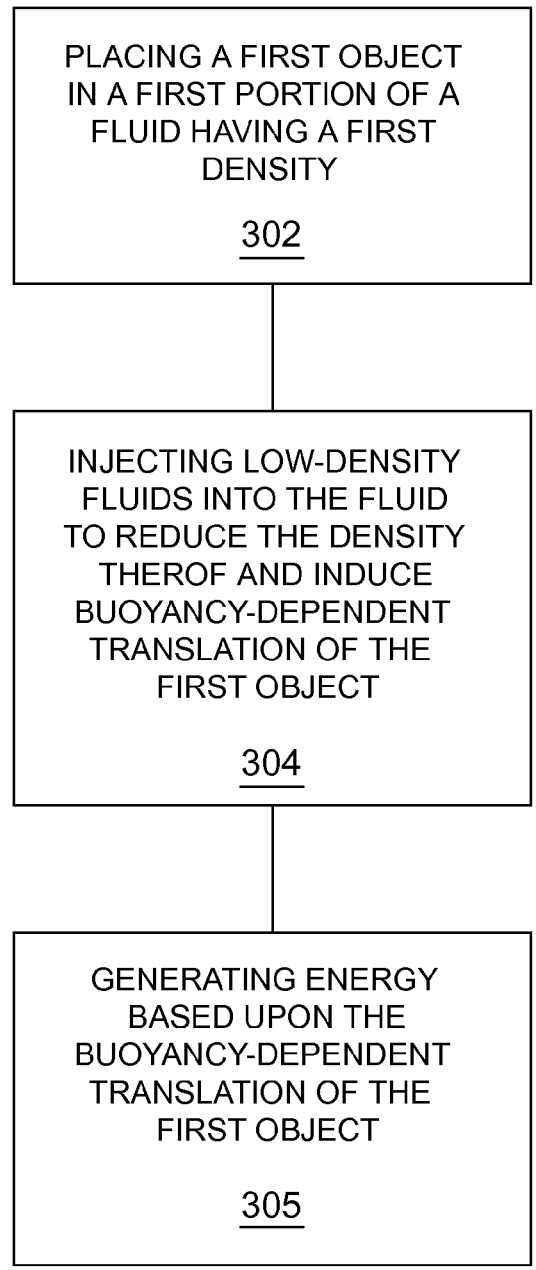
FIG. 3 depicts a flow chart illustrating one or more steps that may be performed according to a method disclosed herein.

One or more methods 300 for generating energy from a waste energy are schematically illustrated in the flow chart of FIG. 3. The one or methods 300 may include placing a first object in a first portion of fluid having a first density 302. The one or more methods 300 may include injecting low-density fluids into the first portion of fluid in order to reduce the density thereof to a second density less than the density of the first object and thereby induce buoyancy-dependent translation of the first object in response thereto 304. The one or more methods may include generating energy based upon buoyancy-dependent translation of the first object 306. Waste energy may be any fluid that is a by-product of some other process and is described further herein with reference to low-density fluids.

Figure 4:
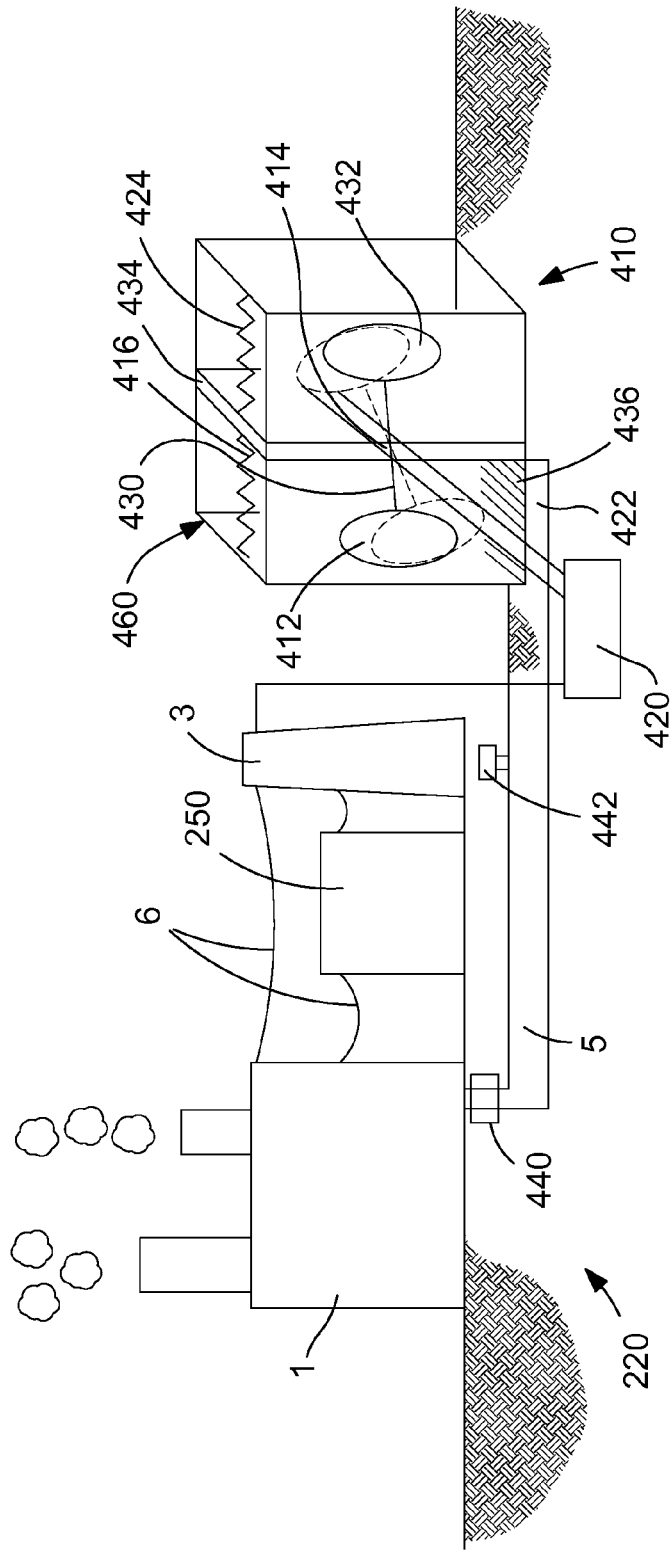
FIG. 4 depicts a system for generating energy from by-products according to one or more embodiments disclosed herein.

One example of an energy generating apparatus according to one or more embodiments of the presently disclosed subject matter is illustrated in FIG. 4 in which a production facility 1 could be used in combination with the methods, apparatuses, and systems of the presently disclosed subject matter. The production facility 1 may be a coal, nuclear, or other power plant, or may be any suitable industrial facility that has low-density fluid as a by-product. The facility 1 may include the external energy storage device 250. The energy storage device 250 may be connected with an energy transmission line such as a power line 6 to a power line support 3.

The facility 1 may be positioned on a nearby ground structure. Piping 5 or other appropriate devices may be provided for transporting a low-density fluid from the facility 1 to a first portion of fluid 416. A pump 440 may be provided for providing pumping forces to pump the low-density fluid from the facility 1 to the body of fluid 416. A flow meter 442 may be provided in communication with the piping 5 for monitoring the amount of low-density fluid that flows therethrough.

One or more embodiments according to the presently disclosed invention are depicted in FIG. 4 in which the facility 1 cooperates with an apparatus 410 for producing energy. The facility 1 is similarly coupled to energy storage device 250 and power transmission line support 3 by power transmission lines 6. A pump 440 may provide pumping forces to pump a low-density fluid through pipe 5. A flow meter 442 may be provided in communication with the pipe 5 for varying the flow of low-density fluid. A fluid injector 422 may be provided on an end of the pipe 5 for injecting low-density fluids into a first portion of fluid 416. A baffle or other type of fluid separator 436 may be provided about the outlet of the fluid injector 422 for dispersing low-density fluid. The apparatus 410 includes a first object 412 in the first portion of fluid 416 carried by a support 430 that extends from a pivot 414 that may be carried by a density barrier 434 for separating the first portion of fluid 416 from a second portion of fluid 424 in which a second object 432 is carried by the support 430 extending from the pivot 414. The pivot 414 is coupled to an electric generator 420 similar to generator 330 as disclosed in FIG. 3.

The apparatus 410 is configured for back and forth reciprocating movement in which the first object 412 translates downwardly when low-density fluid is injected into the first portion of fluid 416 and the density thereof is reduced to less than the density of the first object 412. The apparatus 410 may be configured such that intermittent applications of low-density fluid are injected into the first portion of fluid 416 such that enough low-density fluid is first injected into the first portion of fluid 416 until the first object 412 pivots counter-clockwise until almost reaching the density barrier 434. At that point, low-density fluid is no longer injected into the first portion of fluid 416 and the density begins to return to the natural density thereof. As this occurs, the first object 412 pivots clockwise until the relative vertical positioning is generally the same as that of the second object 432.

In one or more embodiments, a low-density injector may be provided at both the first portion of fluid 416 and the second portion of fluid 424 such that alternating, intermittent injections of low-density fluid can be made in each respective portion of fluid.

As illustrated in FIG. 4, the apparatuses for generating energy disclosed herein may be self contained in a stand-alone container 460 or may be part of a natural environment such as an ocean, lake, or other body of water.

As illustrated in the block generally relating to the step of generating energy based upon buoyancy-dependent translation of the object in the fluid 140, such a step may be encompassed by the apparatus 410. For example, as the first portion of fluid 416 returns to its natural density, the first object 412 will begin to undergo buoyancy-dependent translation in a generally upwards direction until the object 412 is in general alignment with the second object 432. In this manner, energy generation may be effectuated during generally upwards translation of the apparatus 410 as the first portion of fluid 416 returns to its natural density.

Many physical phenomena occur during the injection of low density fluid, specifically the bubbles created when injecting a low density fluid such as a gaseous fluid into a fluid such as a liquid. For example, due to their drag, impact, and sticking, the bubbles could directly produce upward forces on the body as they ascend upward. In addition, surface tension at the boundary of the body and liquid causes an upward force to be exerted on the body. There are also effects that could cause downward forces. There may be a shadow region above the body where bubbles are absent, whereas the equality of the average densities for sinking assumes that the bubbles are distributed uniformly throughout the liquid. This causes a greater pressure to be exerted on the top of the body, and thus corresponds to a downward force. Bubbles are deflected around the body, so there could be a layer of greater density of bubbles on the bottom surface of the body. This could cause the body to sink at a greater average fluid density, corresponding to an effective downward force. Due to entrained motion of the liquid, there is also a possible reduction of the buoyancy as a result of the Bernoulli effect. Further discussion on these phenomena can be found in the paper entitled "When do bubbles cause a floating body to sink" in the American Journal of Physics, October, 2001 edition by Denardo et al.

Figure 5:
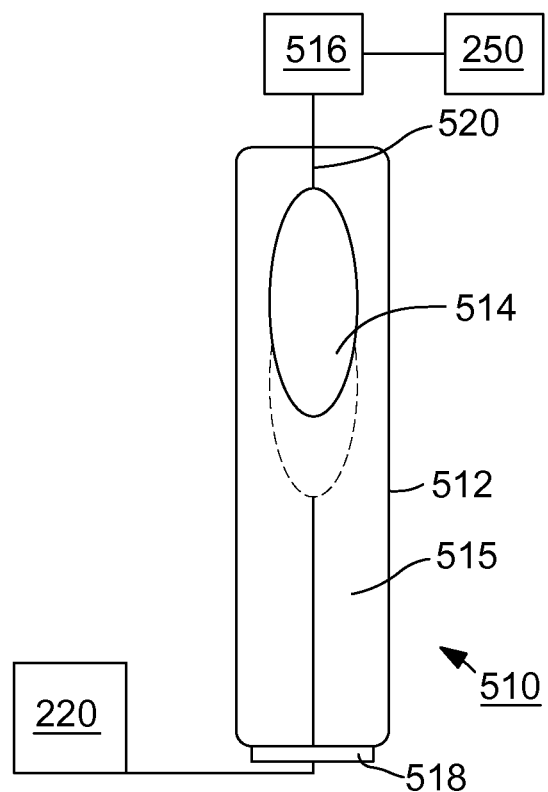
FIG. 5 depicts an apparatus for generating energy from by-products according to one or more embodiments disclosed herein.

An apparatus for generating electricity according to one or more embodiments of the disclosed subject matter is illustrated in FIG. 5 and is generally designated 510. The apparatus 510 may be in communication with a low-density fluid injector 518 that is in communication with the low-density fluid source 220. The apparatus 510 includes a chamber 512 that is configured for containing a fluid 515 therein. An object 514 is provided within the fluid 515 and is further coupled to an electrical generator 516 that is configured for generating electrical energy upon translation of the object 514. The object 514 is coupled to the electrical generator 516 by a linking member 520, which may be a cable, support rod, or similar structure. The electrical generator 516 may then be coupled to the energy storage device 250 for storing energy generated thereby. In other embodiments, the electrical generator 516 may be coupled directly with an energy consuming appliance or device.

The apparatus 510 is configured such that the object 514 has a density that is less than or equal to the natural density of the fluid 515 contained within the chamber 512. In this manner, the object 514 generally floats or is suspended within the fluid 515 when the fluid 515 is at natural density. As low-density fluid is injected into the chamber 512 by the injector 518, the object 514 will then begin to translate downwardly once the density of the fluid 515 is less than that of the object 514. As the object 514 translates downwardly, the linking member 520 will impart movement to the generator 516, thereby generating electrical energy. Low-density fluid may continue to be injected into the chamber 512 until the object 514 reaches a desired downward position. At that point, low-density fluid is no longer injected and the fluid 515 begins to return to its natural density. As this occurs, the object 514 will begin to translate upwardly to its initial position. Once the object 514 returns to its initial position, the low-density fluid injection process can be initiated again.

Figure 6:
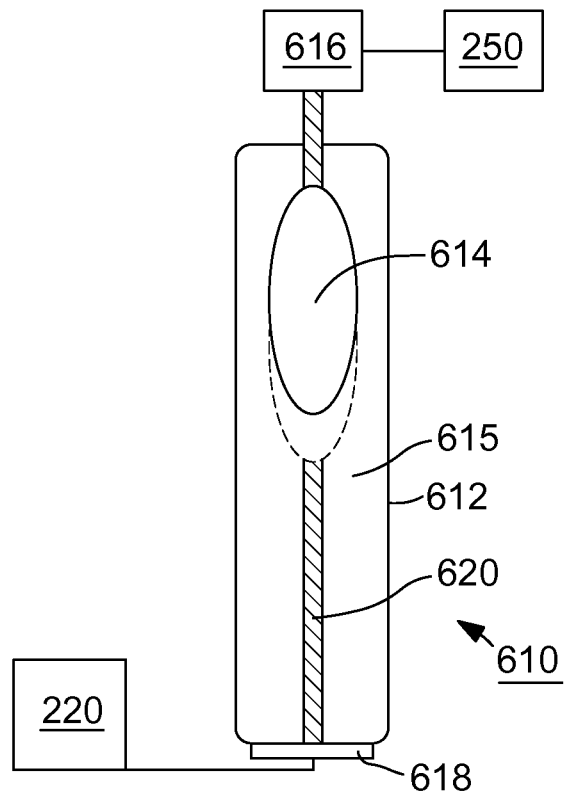
FIG. 6 depicts an apparatus for generating energy from by-products according to one or more embodiments disclosed herein.

An apparatus for generating electricity according to one or more embodiments of the disclosed subject matter is illustrated in FIG. 6 and is generally designated 610. The apparatus 610 may be in communication with a low-density fluid injector 618 that is in communication with the low-density fluid source 220. The apparatus 610 includes a chamber 612 that is configured for containing a fluid 615 therein. An object 614 is provided within the fluid 615 and is threadably received within a shaft 620. The shaft 620 is further coupled to an electrical generator 616 that is configured for generating electrical energy upon rotation of the shaft 620. The shaft 620 is configured for rotational movement as the object 614 translates upwardly and downwardly due to buoyancy-dependent translation thereof. This may be accomplished by affixing the object 614 to a wall of the chamber 612 such that the rotational arrangement of the object 614 remains the same as the object 614 translates vertically. The electrical generator 616 may then be coupled to the energy storage device 250 for storing energy generated thereby. In other embodiments, the electrical generator 616 may be coupled directly with an energy consuming appliance or device.

The apparatus 610 is configured such that the object 614 has a density that is less than or equal to the natural density of the fluid 615 contained within the chamber 612. As low-density fluid is injected into the chamber 612, the object 614 will then begin to translate downwardly once the density of the fluid 615 is less than that of the object 614. As the object 614 translates downwardly, the shaft 620 rotates and imparts corresponding rotational movement to the generator 616, thereby generating electrical energy. Low-density fluid may continue to be injected into the chamber 612 until the object 614 reaches a desired downward position. At that point, low-density fluid is no longer injected and the fluid 615 begins to return to its natural density. As this occurs, the object 614 will begin to translate upwardly to its initial position. Once the object 614 returns to its initial position, the low-density fluid injection process can be initiated again.

Figure 7:
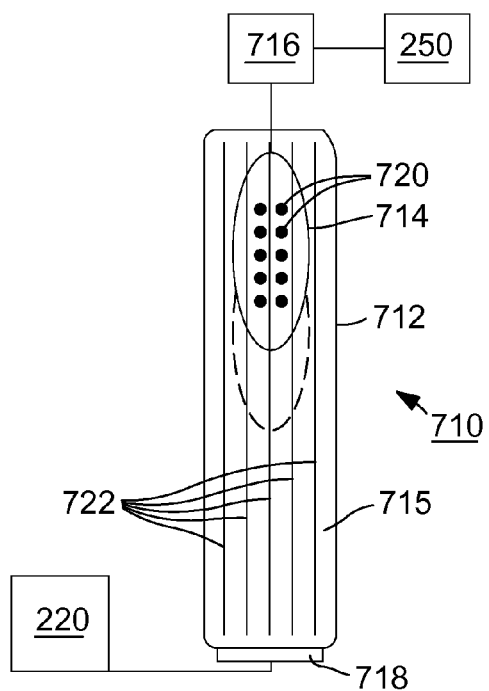
FIG. 7 depicts an apparatus for generating energy from by-products according to one or more embodiments disclosed herein.

An apparatus for generating electricity according to one or more embodiments of the disclosed subject matter is illustrated in FIG. 7 and is generally designated 710. The apparatus 710 may be in communication with a low-density fluid injector 718 that is in further communication with the low-density fluid source 220. The apparatus 710 includes a chamber 712 that is configured for containing a fluid 715 therein. An object 714 is provided within the fluid 715 and is configured for vertical buoyancy-dependent translation. The object 714 defines at least one magnet 720 on a surface thereof. Each of the magnets 720 are configured for induction energy generation upon translation about induction coils 722 defined on a surface of the chamber 712. An electrical transformer 716 may then be provided for converting the induction charges into a useable form of electricity. The electrical transformer 716 may then be coupled to the energy storage device 250 for storing energy generated thereby. In other embodiments, the electrical transformer 716 may be coupled directly with an energy consuming appliance or device.

The apparatus 710 is configured such that the object 714 has a density that is less than or equal to the natural density of the fluid 715 contained within the chamber 712. As low-density fluid is injected into the chamber 712, the object 714 will then begin to translate downwardly once the density of the fluid 715 is less than that of the object 714. As the object 714 translates downwardly, the induction energy is created by the passing of the magnets 720 by the coils 722. Low-density fluid may continue to be injected into the chamber 712 until the object 714 reaches a desired downward position. At that point, low-density fluid is no longer injected and the fluid 715 begins to return to its natural density. As this occurs, the object 714 will begin to translate upwardly to its initial position. Once the object 714 returns to its initial position, the low-density fluid injection process can be initiated again.

Figure 8:
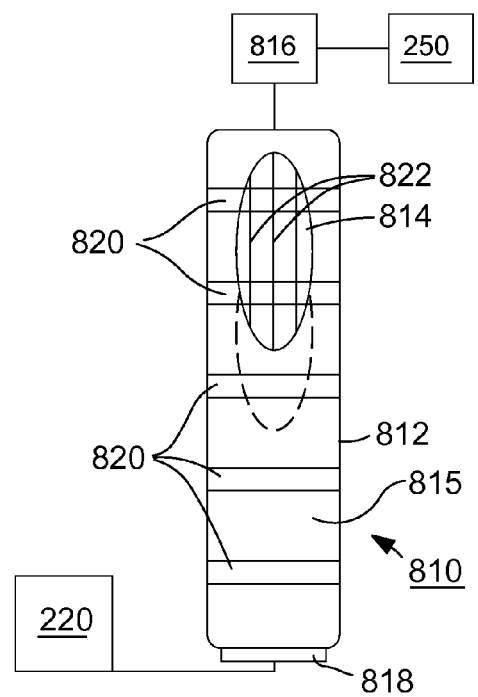
FIG. 8 depicts an apparatus for generating energy from by-products to one or more embodiments disclosed herein.

An apparatus for generating electricity according to one or more embodiments of the disclosed subject matter is illustrated in FIG. 8 and is generally designated 810. The apparatus 810 may be in communication with a low-density fluid injector 818 that is in further communication with the low-density fluid source 220. The apparatus 810 includes a chamber 812 that is configured for containing a fluid 815 therein. An object 814 is provided within the fluid 815 and is configured for vertical buoyancy-dependent translation. The object 814 defines at least one induction coil 822 on a surface thereof. Each of the induction coils 822 are configured for induction energy generation upon translation about magnets 820 defined on a surface of the chamber 812. An electrical transformer 816 may then be provided for converting the induction charges into a useable form of electricity. The electrical transformer 816 may then be coupled to an energy storage device 250 for storing energy generated thereby. In other embodiments, the electrical transformer 816 may be coupled directly with an energy consuming appliance or device.

The apparatus 810 is configured such that the object 814 has a density that is less than or equal to the natural density of the fluid 815 contained within the chamber 812. As low-density fluid is injected into the chamber 812, the object 814 will then begin to translate downwardly once the density of the fluid 815 is less than that of the object 814. As the object 814 translates downwardly, the induction energy is created by the passing of the magnets 820 by the coils 822. Low-density fluid may continue to be injected into the chamber 812 until the object 814 reaches a desired downward position. At that point, low-density fluid is no longer injected and the fluid 815 begins to return to its natural density. As this occurs, the object 814 will begin to translate upwardly to its initial position. Once the object 814 returns to its initial position, the low-density fluid injection process can be initiated again.

Figure 9:
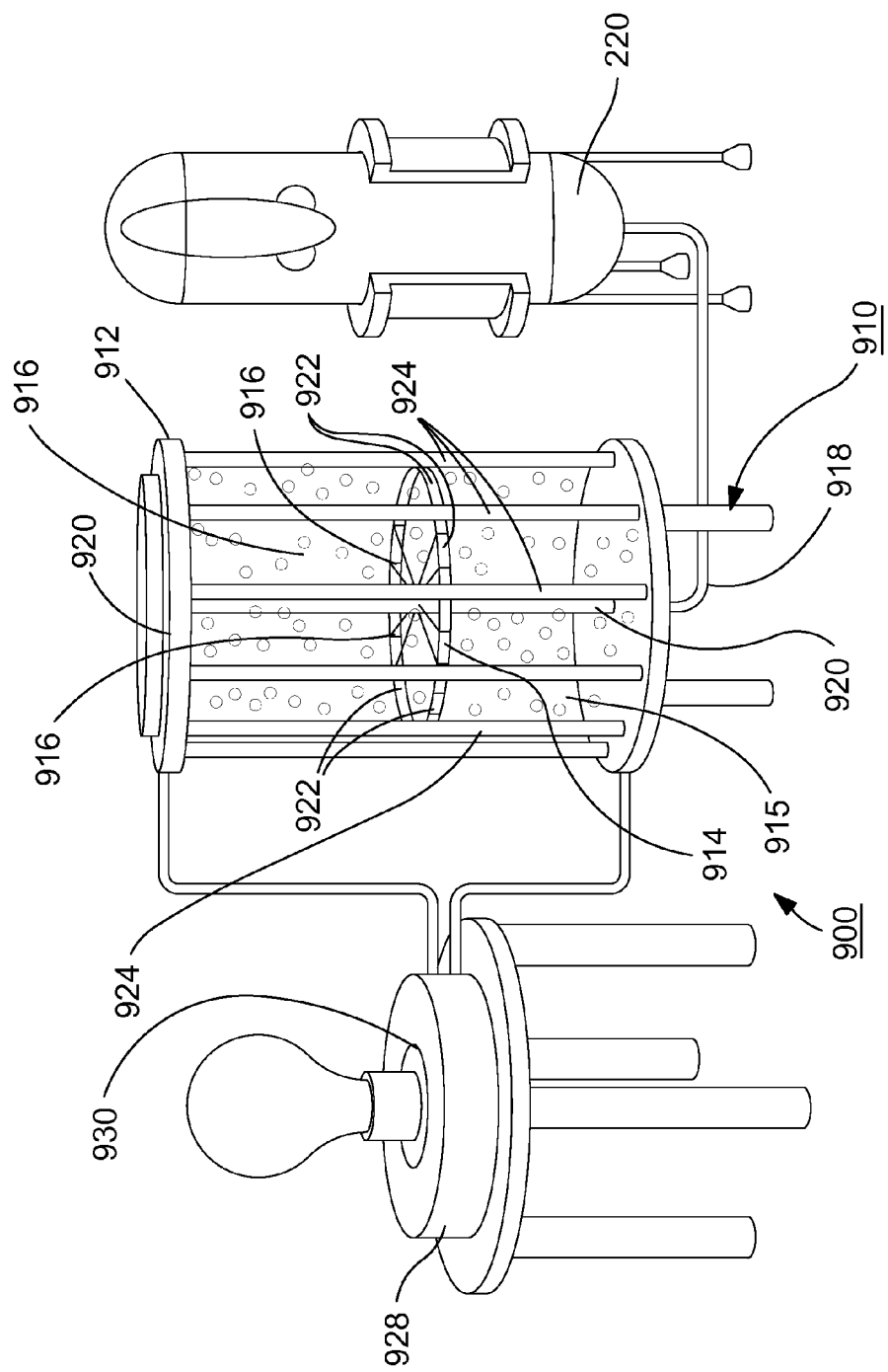
FIG. 9 depicts an apparatus for generating energy from by-products according to one or more embodiments disclosed herein.

A system 900 for use with an apparatus 910 for generating electricity according to one or more embodiments of the disclosed subject matter is illustrated in FIG. 9. The apparatus 910 may be in communication with a low-density fluid injector 918 that is in further communication with the low-density fluid source 220. The apparatus 910 includes a chamber 912 that is configured for containing a fluid 915 therein. A shuttle 914 is provided within the fluid 915 and is configured for vertical buoyancy-dependent translation. The shuttle 914 defines a ring of magnets 922 that extend in a periphery about the inner diameter of the chamber 912. The ring of magnets 922 may be spaced apart from a central shaft 920 that extends from a lowermost to an uppermost position within the chamber 912 and may be coupled together by a plurality of blades 916 extending from the central shaft 920 to the ring of magnets 922. Each of the magnets 922 are configured for induction energy generation upon translation about induction coils 924 defined on a surface of the chamber 912. This induction may be caused by generally vertical translation of the magnets 922 about the induction coils 924, or may be alternatively caused by rotational translation of the magnets 922 about the induction coils 924 due to an angular relationship of the blades 916 relative to the central shaft 920. An energy generator 928 may be provided for converting induction energy into other forms of energy. An energy consuming device 930, illustrated as a light bulb in FIG. 9, may be provided in communication with the energy generator 918 for using generated energy.

The apparatus 910 is configured such that the shuttle 914 has a density that is less than or equal to the natural density of the fluid 915 contained within the chamber 912. As low-density fluid is injected into the chamber 912, the shuttle 914 will then begin to translate downwardly once the density of the fluid 915 is less than that of the shuttle 914. As the shuttle 914 translates downwardly, the induction energy is created by the passing of the magnets 922 by the coils 924. The central shaft 920 may be provided with a threaded portion for imparting rotational movement to the shuttle 914 as is translates vertically. Low-density fluid may continue to be injected into the chamber 912 until the shuttle 914 reaches a desired downward position. At that point, low-density fluid is no longer injected and the fluid 915 begins to return to its natural density. As this occurs, the shuttle 914 will begin to translate upwardly to its initial position. Once the shuttle 914 returns to its initial position, the low-density fluid injection process can be initiated again.

Figure 10:
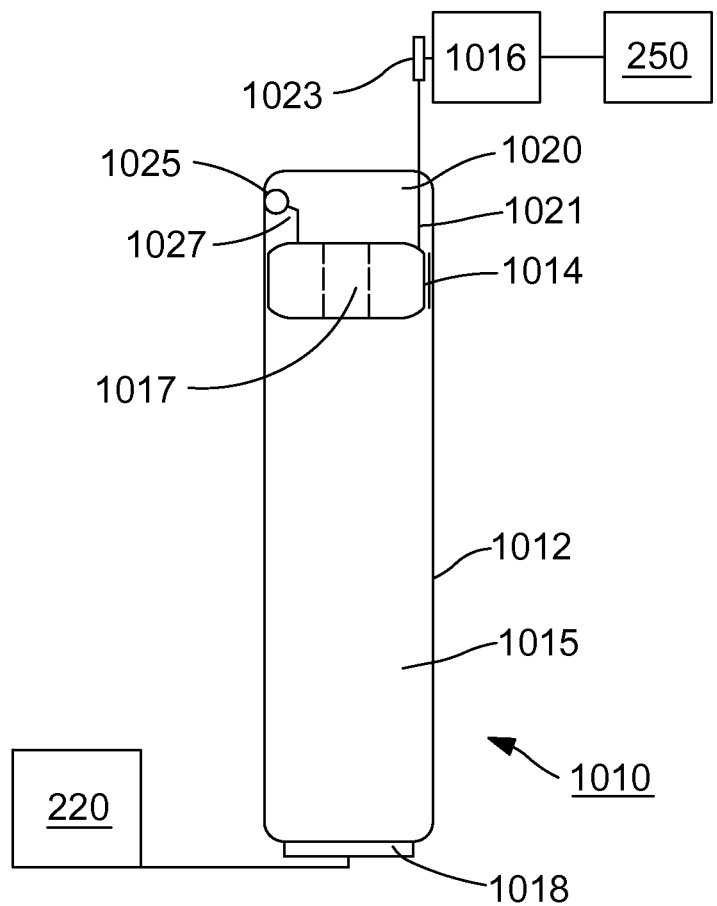
FIG. 10 depicts an apparatus for generating energy from by-products according to one or more embodiments disclosed herein.

An apparatus for generating electricity according to one or more embodiments of the disclosed subject matter is illustrated in FIG. 10 and is generally designated 1010. The apparatus 1010 may be in communication with a low-density fluid injector 1018 that is in further communication with the low-density fluid source 220. The apparatus 1010 includes a chamber 1012 that is configured for containing a fluid 1015 therein. An object 1014 is provided within the fluid 1015 and is configured for vertical buoyancy-dependent translation. The object 1014 may define an opening 1017 for allowing flowthrough of fluids within the chamber 1012.

The object 1014 may be coupled to a generator 1016 that has a hub 1023 extending therefrom and connected by a linking member 1021 which may be a belt and pulley assembly. The generator 1016 may then be coupled to the energy storage device 250 for storing energy generated thereby. In other embodiments, the generator 1016 may be coupled directly with an energy consuming appliance or device.

The object 1014 may further define a guide rail 1025 defined on the chamber for engaging a roller wheel 1027. The guide rail 1025 and roller wheel 1027 may be provided for maintaining the object 1014 in a desired position.

The apparatus 1010 is configured such that the object 1014 has a density that is less than or equal to the natural density of the fluid 1015 contained within the chamber 1012. As low-density fluid is injected into the chamber 1012, the object 1014 will then begin to translate downwardly once the density of the fluid 1015 is less than that of the object 1014. As the object 1014 translates downwardly, the generator 1016 generates energy. Low-density fluid may continue to be injected into the chamber 1012 until the object 1014 reaches a desired downward position. At that point, low-density fluid is no longer injected and the fluid 1015 begins to return to its natural density by escape of low-density fluids into the atmosphere. As this occurs, the object 1014 will begin to translate upwardly to its initial position. Once the object 1014 returns to its initial position, the low-density fluid injection process can be initiated again.

Alternatively, in one or more embodiments, an underground storage field may be utilized as a storage facility for storing compressed low-density fluid output from a power plant such as that depicted in FIGS. 3 and 4 in a process similar to Compressed Air Energy Storage (CAES). When used in conjunction with one of the energy generating systems or apparatuses disclosed herein, compressed gases and other fluids may be stored underground and then diverted to appropriate uses when desired. It may also be suitable to utilize one of the systems or apparatuses disclosed herein on a continuous or on a select basis. For example, if utilizing the injection of low-density fluids, it may be appropriate to operate one of the systems or apparatuses disclosed herein on a continuous basis. In other circumstances, it may be desirable to utilize one of the systems or apparatuses only during peak energy consumption periods so as to increase the spot supply during those peak times. Accordingly, a control system may be implemented to monitor energy usage about the energy grid, and then command operation of one of the systems or apparatuses disclosed herein in response to monitoring. In other embodiments, a recirculation and storage system may be utilized with any of the apparatuses disclosed herein for capturing spent low-density fluid after energy generation. This may be particularly advantageous for instances where carbon dioxide or other potentially unsafe low-density fluids are used. The captured low-density fluid could then be stored in an external storage tank, and optionally compressed for re-injection into one of the apparatuses disclosed herein and used to feed a biofuel stock such as algae. The energy for the optional compression can be provided by grid energy, from other energy sources such as excess wind or solar energy or from energy from the described process of translation of an object connected to a generator via a density change.

In other embodiments, tidal technologies may be employed with the subject matter disclosed herein. For example, roller plates stacked in a vertical shaft filled with a fluid and constructed adjacent to each other provide large scale energy generation on a small foot print. As low density fluid is injected into the bottom of the shaft, the low density fluid passes each roller plate, causing each roller plate to descend due to the reduced density. Each of the apparatuses and systems described herein may be carried out in an open environment in which the low density fluid is allowed to escape to the environment.

Figure 11:
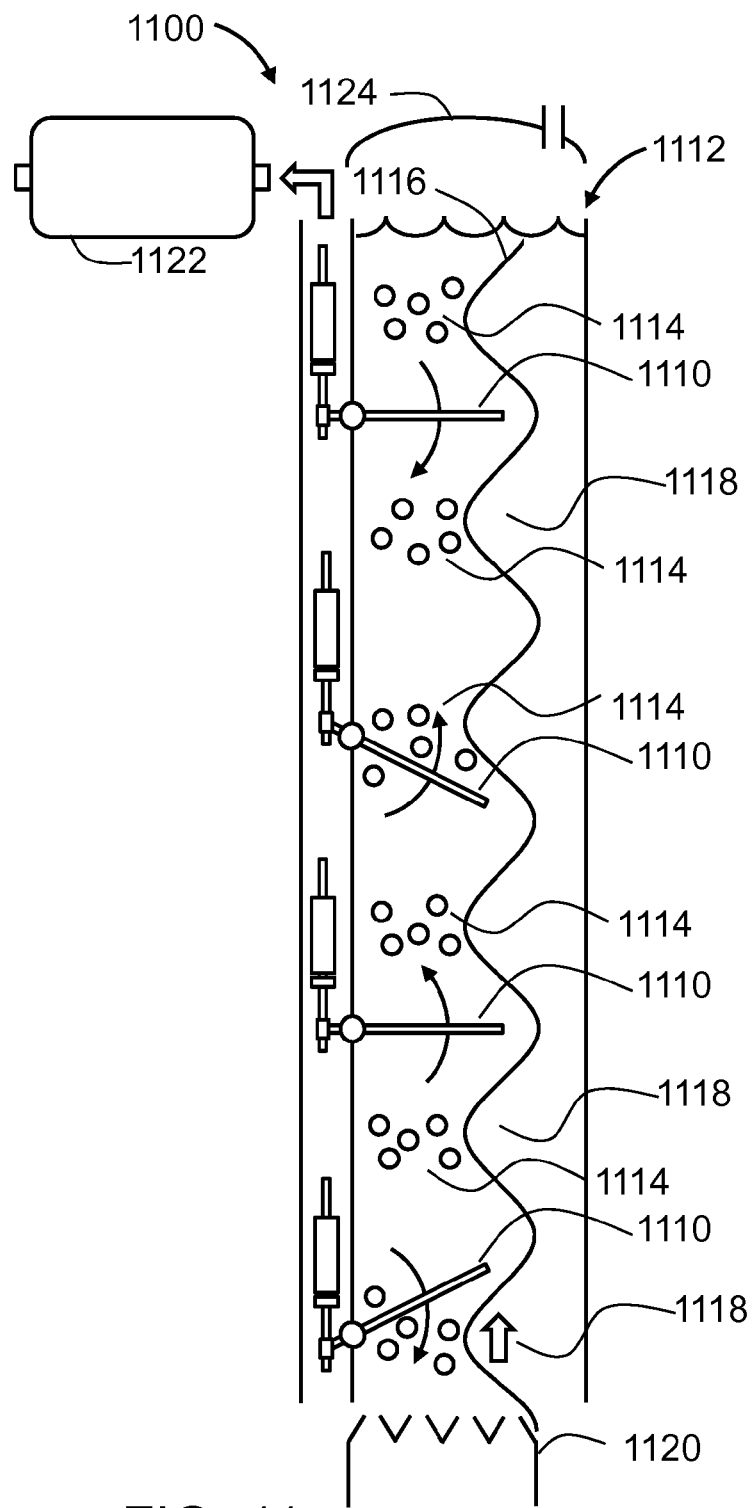
FIG. 11 depicts a density engine according to one or more embodiments disclosed herein.

A density engine 1100 according to at least one embodiment is shown in FIG. 11. Sponsons or roller plates 1110 are stacked in a vertical concrete shaft 1112 filled with water or other host liquid, in which the roller plates 1110 are buoyant. As such, the density engine 1100 defines a chamber containing a host liquid having a first density and objects positioned in the host liquid, each having a density less than the first density of the host liquid.

As bursts of gas 1114 such as carbon dioxide are released at the bottom of the shaft, density waves 1116 are generated in which rising low density fluid regions 1118 correspond to the rising bursts of gas 1114. A fluid region 1118 may contain some amount of the host liquid as vapor, mist, droplets, layers among bubbles and foam, churning liquid, liquid and gas entrained together, or some other form of liquid and gas mixture. The bursts of gas 1114 are released by an injector 1120 below the roller plates 1110. The lower density fluid regions 1118 travel up the shaft 1112 passing each roller plate 1110, causing each roller plate to descend in turn as buoyancy is lost due to the low density of the regions 1118. Once a low density region passes a roller plate 1110, natural density of the host liquid returns and buoyancy returns to the roller plate 1110 causing the roller plate 1110 to ascend. Oscillatory motion is thus effected for each roller plate 1110, and energy is derived therefrom. In the illustrated embodiment, the oscillatory motion of each roller plate 1110 drives hydraulic fluid through a turbine to drive a generator 1122, or drives other fluid, mechanical, magnetic, or electrical coupling to drive the generator 1122, thus creating electrical energy. The hydraulic fluid or other coupling is driven as each roller plate 1110 oscillates rotationally about a respective pivot point.

In at least one embodiment, the injector 1120 injects bursts of gas 1114 periodically such that rising low density regions 1118 are created periodically as shown in FIG. 11 in which density waves 1116 are represented as a sinusoidal wave form. The sinusoidal wave form represents density fluctuation, not a surface of the host liquid.

Each burst of gas 1114 eventually nears the top surface of the host liquid and emanates therefrom. The emanated gas is received by a collector 1124 above the roller plates 1110 and may be released through a conduit to the environment or may be recycled, sequestered, stored, or utilized in further energy or biofuel production.

In the illustrated embodiment (FIG. 11), efficiency multiplier effects occur. Each movement, either up or down, of each roller plate 1110 drives hydraulic fluid or other coupling thus multiplying the energy production effect. Furthermore, because multiple roller plates 1110 are affected by each rising low density region 1118, the energy derived from each density wave is multiplied. A multiplication factor or gain in this regard is predetermined according to the number of sponsons or roller plates 1110 vertically stacked, with higher numbers of sponsons or roller plates providing higher gain. Multiple shafts 1112 may be constructed adjacent to each other to provide large scale energy generation on a small foot print at land or sea.

Conventional tidal buoys can be converted to density engines deriving power from density waves composed of intermittent rising lowered density fluid regions 1118 separated by natural density regions. Already deployed buoys may require conversion to generate electrical energy as density engines. While tidal resources can be intermittent, density waves according to descriptions herein are created on demand.

Density wave energy production is accomplished, in some embodiments, without petrochemical or radioactive fuels being utilized by leveraging the physics of buoyancy, gravity, and the Archimedes principle of "Up-Thrust." Processes described herein utilize gases such as carbon dioxide to produce electricity. Carbon dioxide is an abundant greenhouse gas, much of which is created by the burning of fossil fuels. Density wave energy production is synergistic and compatible with natural renewable energy sources such as wind, solar, and tides In at least one embodiment described herein, utility scale energy is stored by carbon dioxide sequestration. Density engine based power production plants strategically placed at renewable energy cultivation sites resolve the dispatch and intermittency issues of wind and solar farms. Combining density engine power production, utility energy storage by carbon dioxide sequestration, a wind farm, and an algae biofuel facility utilizing the same plot of land achieves significant advantages. Clean renewable energy production coupled with density engine based power production on demand, energy storage by carbon dioxide sequestration, and algae growth may contribute to reducing our dependence on foreign oil while helping to maintain a clean environment.

Density engine base power production uses available by-product gas to reduce the natural buoyancy force of water, seawater or other liquids by the introduction of the gas to reduce the effective density of the liquid. Due to its expansion properties (875:1) and other considerations such as industrial and power facility by-product availability, carbon dioxide is a cost effective gas for use in density engines. A premise of a density engine, in embodiments described herein, is that if a gas is appropriately dispersed beneath a floating ("buoyant") structure, a piston for example, buoyancy force of the fluid acting on the piston is dramatically reduced and overcome by the gravitational pull on the piston, which therefore falls.

In a power generation system using density engine technology, the gas is released in a controlled cyclical process beneath the piston. This allows gravity to cause the assembly to fall. This rapid descent down the chamber converts potential energy to kinetic energy. As the piston nears the tank's bottom, the gas injection in the fluid is abated. The natural buoyancy force of the water or other liquid is re-established and the piston ascends toward the top of the containment tank.

One may consider the technology as an inverted hydroelectric or wind turbine power generator. As a hydroelectric plant utilizes the kinetic energy of water flowing under pressure to turn turbines, a density engine utilizes the kinetic energy of a moving object through water. In each case potential energy is converted to kinetic energy and electromagnetic force is utilized to convert kinetic energy to electrical energy. However, rather than being limited to dam locations, a density engine can be implemented almost anywhere space permits. The density engine process uses very abundant, potentially inexpensive and readily available carbon dioxide through scientific principles to generate movement and "green" electricity.

Density engine technology according to some embodiments described herein utilizes carbon dioxide to change the density of liquids. By effectively harnessing gravity and buoyancy with a cyclical density change, power is produced. Optimized density engine power production plants can provide "green" electricity generation coupled with the ability to store massive amounts of reserve power.

Inherently uncontrollable renewable energy resources challenge grid operations. Wind and solar power provides striking examples. With regard to wind power, potential remedies include improved wind turbines, improved tolerances, more accurate forecasting, stabilization and compensation, and energy storage. Of these, electric energy storage represents a comprehensive solution to the problems inherent in intermittent generation. Decoupling intermittent generation from demand by providing large-scale energy storage can increase resource dispatchability and allow intermittent renewable resources to be harnessed during periods of maximum efficiency.

Conventional wind and solar energy collection technologies suffer from intermittency and dispatch issues that are inhibiting their growth. Benefits of density engine based power production as described herein include at least: synergistic technology between fossil fuel electrical plants, algae facilities and sequestration sites; full scale energy generation and storage systems for renewables and fossil fuel utilities; integration and "green" power co-generation with existing electrical utilities; and solving one of the economic choke points of algae biofuel farming and processing.

Currently, considerable resources are being committed to developing algae farming as a biofuel source. Utilizing their delivered compressed carbon dioxide, a density engine based power plant can provide electrical power from a resource that is increasingly available at low costs. Density engine based power plants could discharge water saturated with carbon dioxide when required by a biofuel facility producing ethanol, butanol, diesel and jet fuel. Carbon dioxide saturated water could be piped to feed the algae stock at a desired pH or alkalinity for each specific algae species. Density engine based power production can be integrated with almost any biofuel algae facility regardless of the strain of algae being utilized as most algae based energy technologies require carbon dioxide.

Wind and solar power producers have long needed an economical method to offset the intermittent aspects of their generation profiles. These systems only produce power while the sun is out or with sufficient wind speeds. An optimized and scaled density engine based power plant could be used to meet megawatt-hour (MWh) obligations including spinning and non-spinning reserve power, peak shaving, and possibly allowing renewables to also operate in arbitrage markets. A density engine based power plant could provide the electrical energy needed when conventional renewable systems cannot meet current energy needs, especially at peak demand when a sustained loss of wind or solar power can be most costly and disruptive. Such losses of power can be compensated on location and no re-dispatch of electrical reserves would need to be utilized or fossil fuel burned. During periods of low demand but high power production the wind or solar farms could provide economical wind energy to compress gas for future use in a density engine for time controlled electrical energy generation. Carbon dioxide can be compressed at a ratio of 875:1 to a liquid, thus storing tremendous amounts of energy available for dispatch at any time. There are currently millions of tons of carbon dioxide stored in gas and oil wells in the United States, abandoned by the energy industry.

A utilization of a density engine as described herein could be in utility scale battery back-up systems deployed at renewable sites. Density engine based power production is an economical method of integrating carbon dioxide sequestration into the footprint of a renewable energy farm to provide consistent power mediation to what would otherwise be an intermittent resource.

Figure 12:
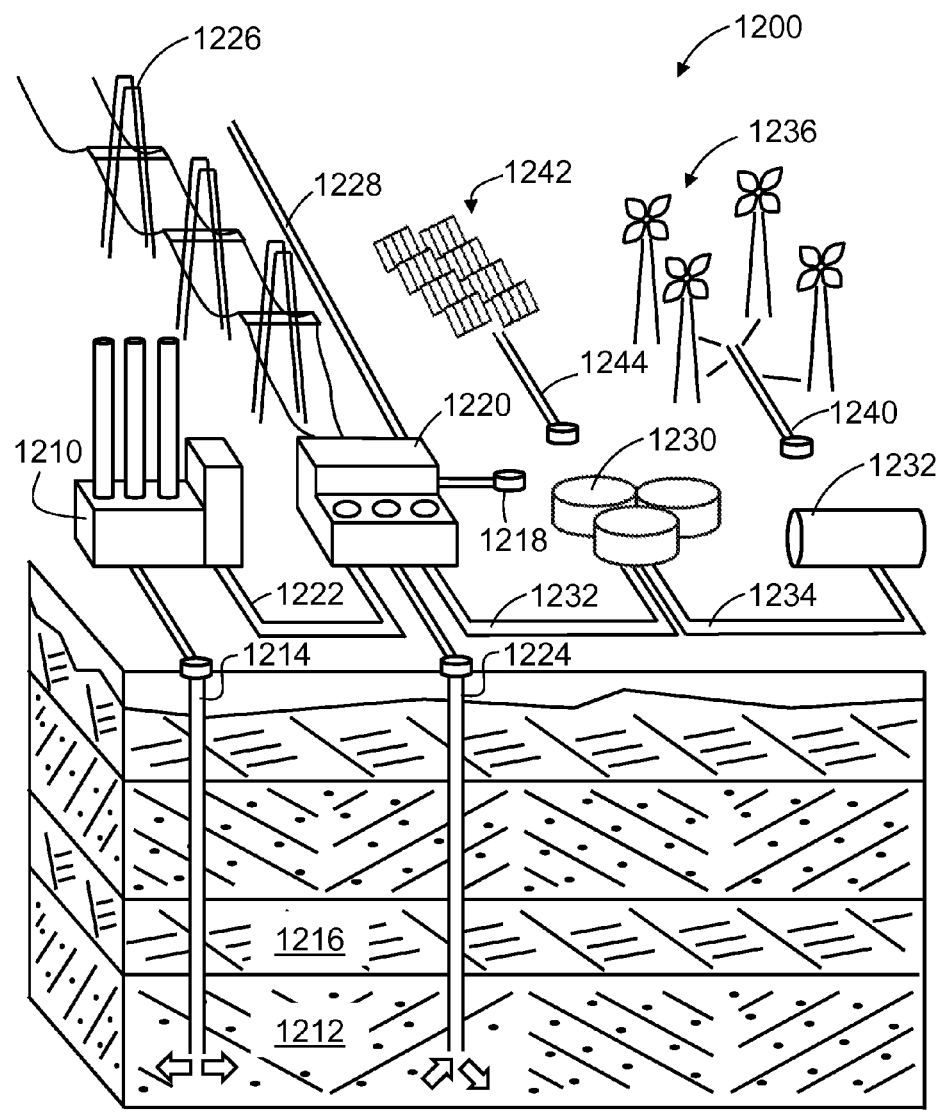
FIG. 12 depicts a consolidated energy production and storage system according to one or more embodiments disclosed herein.

A consolidated energy production and storage system 1200 according to at least one embodiment is shown in FIG. 12, in which a first facility 1210 provides by-product gas such as carbon dioxide. The first facility 1210 may be, for example, a conventional electrical power producing facility that burns a conventional fuel such as coal, oil, or natural gas. The first facility may otherwise be some other industrial facility such as a factory or other energy consuming facility, such as any type of fuel combustion facility, that ultimately generates or has available by-product gas such as carbon dioxide.

The first facility 1210 distributes by-product gas such as carbon dioxide to a sequestration site 1212 through a conduit 1214. In the illustrated embodiment, the sequestration site 1212 includes a subterranean porous earth or rock layer into which gas is injected through the conduit 1214. The subterranean porous layer may be a permeable rock layer and may include salinated, unsalinated or desalinated water. Above the permeable layer is at least one impermeable layer 1216 to confine the injected gas. By product gas such as carbon dioxide can be conveyed in FIG. 12 via the illustrated conduits as dry gas or as, for example, a gas dissolved in solution such as carbon dioxide saturated water, which may be salinated, unsalinated or desalinated water.

The first facility 1210 also distributes by-product gas such as carbon dioxide to a density engine power production facility 1220 directly through a conduit 1222. The density engine power production facility 1220 produces electrical energy from by-product gas such as carbon dioxide according to one or more of several energy-producing systems described herein, such as shown in FIGS. 4-11 or otherwise as represented by the energy cycle of FIG. 1. By-product gas such as carbon dioxide is also conveyed from the sequestration site 1212 through a conduit 1224. Thus, in the illustrated embodiment of a consolidated energy production and storage system 1200 according to FIG. 12, by-product gas such as carbon dioxide is provided from the first facility 1210 to the density engine power production facility 1220 directly, such as through the conduit 1222, and indirectly by way of the sequestration site 1212. Electrical energy produced by the density engine power production facility 1220 is delivered, for example, to a utility grid 1226 for use or storage.

After use in energy production at the density engine power production facility 1220, by-product carbon dioxide is further utilized downstream in a biofuel production facility 1230. A conduit 1232 is illustrated in FIG. 12 as directly linking the biofuel production facility 1230 to the density engine power production facility 1220, and other conveyance systems are within the scope of these descriptions. The biofuel production facility 1230 can be a biofuel producing facility that produces, for example, one or more of ethanol, butanol, biodiesel, gasoline, and jet fuel. Biofuel is produced using a biological process such as the growth of algae or other living organism. The biological process is fed by by-product gas such as carbon dioxide. Biofuel produced at the biofuel production facility 1230 can be conveyed to a storage facility 1232 through a conduit 1234 for storage as illustrated in FIG. 12. The produced biofuel may ultimately be distributed for use, for example, in the first facility 1210.

The illustrated conduit 1224 also represents, in at least one embodiment, the conveyance of gas discharged from the density engine power production facility 1220 to a sequestration site, which may be in fluid communication with the sequestration site 1212 or may be independent therefrom.

The density engine power production facility 1220 additionally utilizes compressed gas from a natural gas well 1218. The potential energy of compressed natural gas is used as the buoyancy affecting gas in power production at the facility 1220. The natural gas is then transported, stored, or utilized for combustion use to harness the chemical energy of the gas. Thus both potential and chemical energy of a natural gas resource are utilized. In the illustrated embodiment, gas is transported from the density engine power production facility 1220 by a conduit 1228. Other gas transport and storage arrangements are within the scope of these descriptions.

Overall, the consolidated energy production and storage system 1200 represents efficient use of land by co-locating energy-consuming, energy-producing, and energy storage facilities. Further facilities may be included as well. For example, a windmill facility 1236 may be included to produce electrical energy from winds. Windmills may be outfitted with gas compression apparatuses linked to a conduit 1240 by which gases such as air compressed by the windmill facility can be conveyed to the density engine power production facility 1220 or to a storage or sequestration site for use when winds are intermittently reduced. For further example, a solar collector facility 1242 may be included to produce electrical energy from solar rays. Solar collectors may be outfitted with gas compression apparatuses linked to a conduit 1244 by which gases such as compressed air can be conveyed to the density engine power production facility 1220 or to a storage or sequestration site for use when solar rays are intermittently reduced. In the illustrated embodiment of the consolidated energy production and storage system 1200, the first facility 1210, sequestration site 1212, the density engine power production facility 1220, the biofuel production facility 1230, the windmill facility 1236, and the solar collector facility 1242 are co-located together on a contiguous plot of land.

Figure 13:
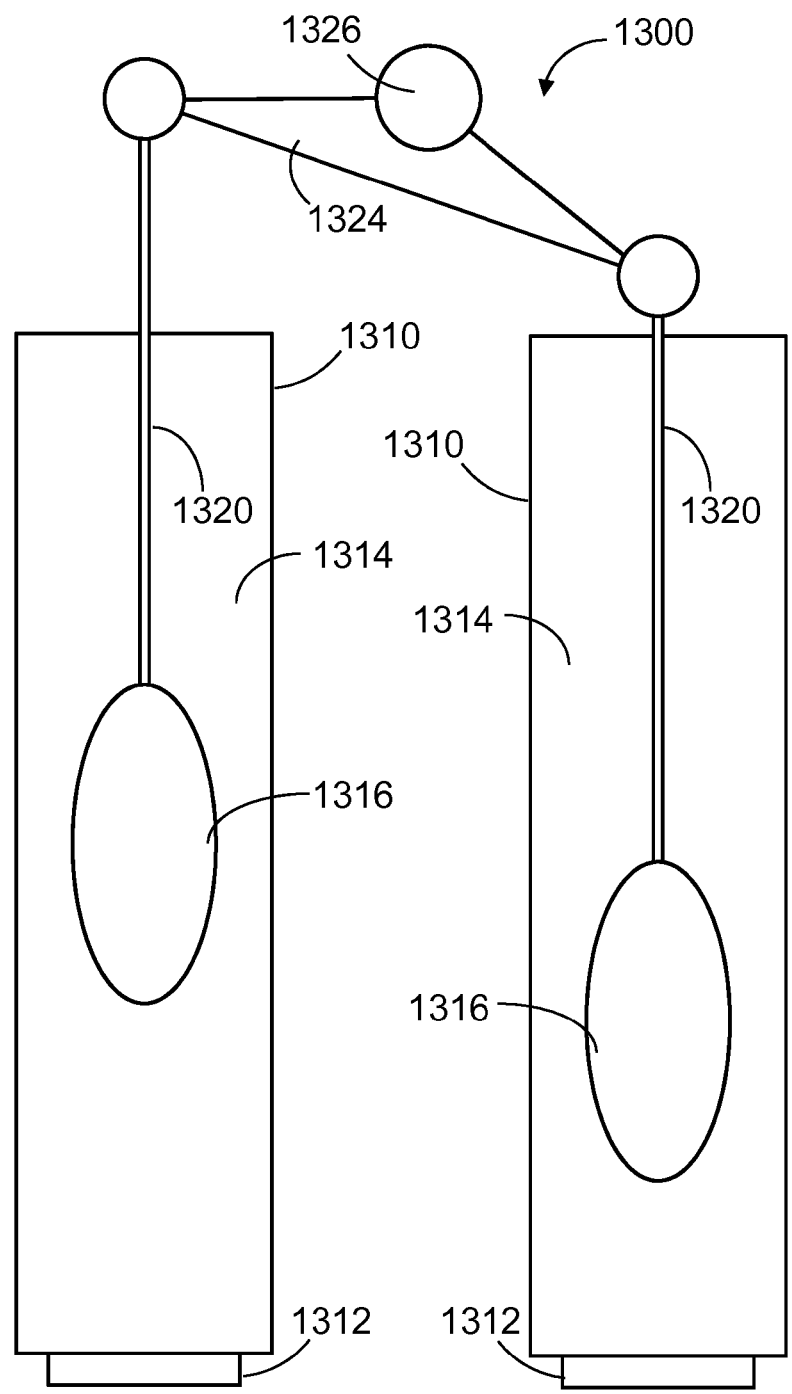
FIG. 13 depicts a dual apparatus 1300 for generating kinetic energy according to one or more embodiments disclosed herein.

A dual apparatus 1300 for generating kinetic energy according to one or more embodiments of the disclosed subject matter is illustrated in FIG. 13. The apparatus 1300 includes two chambers 1310 each in fluid communication with a respective a low-density fluid injector 1312, which is in further communication with a low-density fluid source. Each chamber 1310 is configured for containing a fluid 1314 therein. A respective object 1316 is positioned within the fluid 1314 within each chamber 1310. A respective rigid arm 1320 is attached to each object 1316 such that vertical movements of the objects 1316 force corresponding movements of the rigid arms 1320. The arms 1320 are also attached to opposite ends of a rocker 1324 that rotates partially about a pivot point 1326 upon movement of the objects 1316. A downward stroke for each object 1316 is initiated as low-density fluid is injected by each respective injector 1312, causing each object 1316 to lose buoyancy, which is regained for the upward stoke after cessation of low-density fluid injection. The injectors 1312 are used in a coordinated alternating time schedule to cause a downward stroke for one of the two objects 1316 synchronized with an upward stroke for the other of the two objects 1316. Energy production is thus multiplied by coordinated opposing movements of the two-objects, as the torque applied by the two arms 1320 is additive about the pivot point 1326 of the rocker arm, producing alternating rotational kinetic energy. A shaft or other mechanical or inductive couplings can be used to convert the alternating rotational kinetic energy into other useful energy forms.

Figure 14:
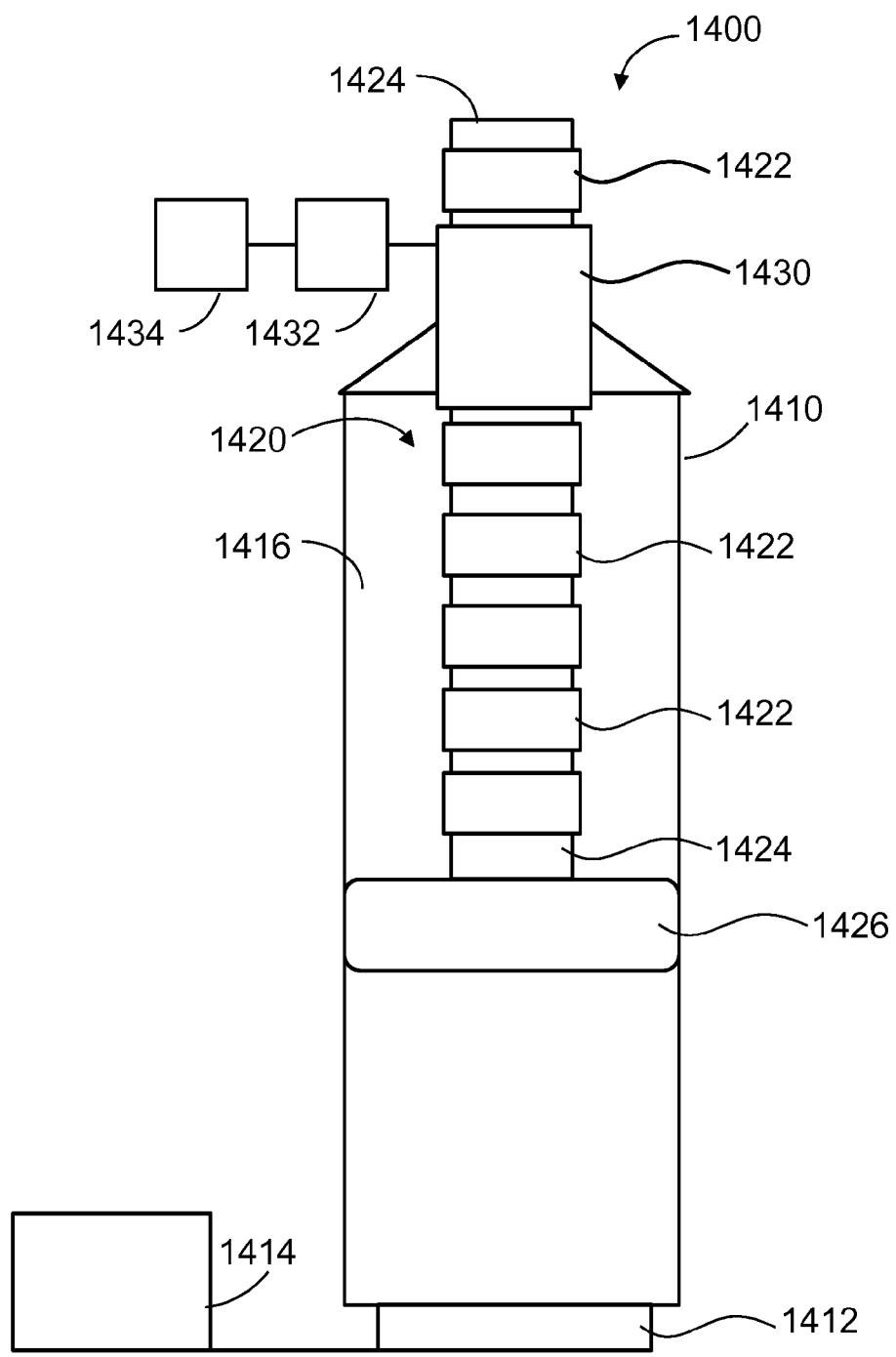
FIG. 14 depicts an apparatus for generating electricity according to one or more embodiments disclosed herein.

An apparatus for generating electricity according to one or more embodiments of the disclosed subject matter is illustrated in FIG. 14 and is generally designated 1400. The apparatus 1400 includes a chamber 1410 in fluid communication with a low-density fluid injector 1412, which is in further communication with a low-density fluid source 1414. The chamber 1410 is configured for containing a fluid 1416 therein. A vertically traveling assembly 1420 is configured to rise and fall at least partially within the chamber. The traveling assembly 1420 includes magnets 1422 spaced vertically along a rigid core 1424. An object 1426 attached to the core 1424 is provided within the fluid 1416 and is configured to provide or assist vertical buoyancy-dependent translation of the traveling assembly 1420. An induction coil assembly 1430 surrounds a portion of the core 1424 and magnets 1422, which move vertically upon vertical movement of the traveling assembly 1420.

The magnets 1422 and induction coil assembly 1430 are configured for induction energy generation upon translation of the traveling assembly 1420. An electrical transformer 1432 may then be provided for converting the induction charges into a useable form of electricity. The electrical transformer 1432 may then be coupled to an energy storage device 1434 for storing energy generated thereby. In other embodiments, the electrical transformer 1432 may be coupled directly with an energy consuming appliance or device.

The apparatus 1400 is configured such that the object 1426 has a density that is less than or equal to the natural density of the fluid 1416 contained within the chamber 1410. As low-density fluid is injected into the chamber 1410 by the injector 1412, the traveling assembly 1420 begins to translate downwardly once the density of the fluid 1416 is less than that of the object 1426. As the traveling assembly 1420 translates downwardly, induction energy is created by movement of the magnets 1422 relative to the induction coil assembly 1430. Low-density fluid may continue to be injected into the chamber 1410 until the traveling assembly 1420 reaches a desired downward position. At that point, low-density fluid is no longer injected and the fluid 1416 begins to return to its natural density. As this occurs, the object 1426 will begin to translate upwardly carrying the traveling assembly 1420 to its initial position. Once the traveling assembly 1420 returns to its initial position, the low-density fluid injection cycle can be initiated again. Induction energy is created by movement of the magnets 1422 relative to the induction coil assembly 1430 both in downward and upward stroke phases of the cycle.

Figure 15:
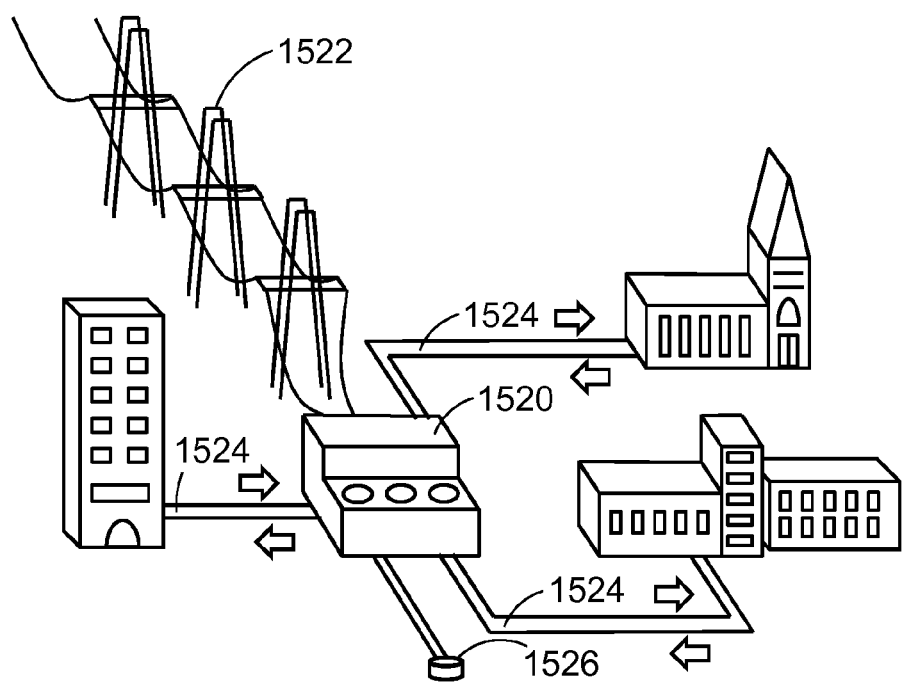
FIG. 15 depicts a multipurpose metropolitan setting in which a power generation facility provides cooling fluid to a variety of dwelling spaces.

FIG. 15 depicts a multipurpose metropolitan setting in which a power generation facility 1520, for example a facility using density engine technology, produces energy that is conveyed from the facility 1520 by a utility grid 1522 for local or distal use immediately or as stored. Buoyancy based energy producing systems described herein that derive energy from gases injected into liquids derive further utility from the cooling of gas expansion. As a compressed gas expands, temperature lowers in adiabatic and partially adiabatic conditions. In some embodiments described herein, fluid such as water cooled by gas expansion is utilized as a cooling fluid by which human dwelling spaces are thermally maintained. In the example of FIG. 15, air conditioning is facilitated by chilled water circulating through supply and return conduits 1524. The conduits 1524 may be thermally insulated and may be above or below ground. For example, air conditioning systems are cooled at commercial buildings, educational facilities, office towers, entertainment and retail centers, and residential apartments. Chilled water and/or by-product gas may be sequestered or routed through subterranean conduit systems 1526.

Figure 16:
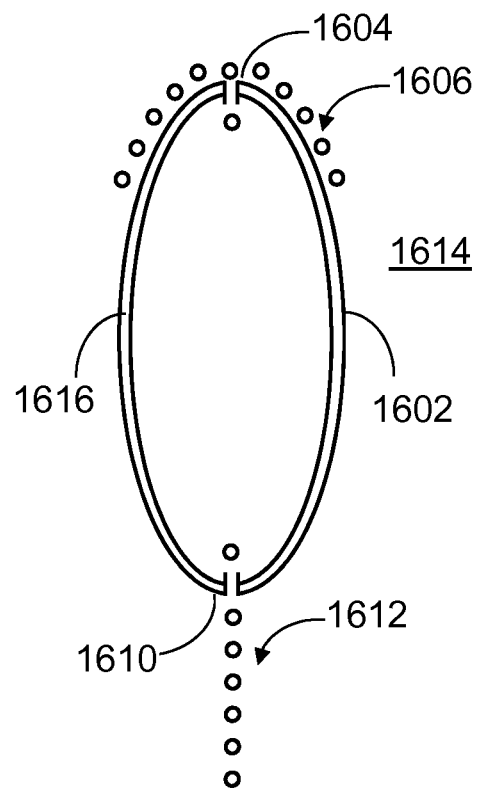
FIG. 16 depicts an object having leading and trailing edge gas streams according to at least one embodiment.

FIG. 16 depicts an object 1602 configured for buoyancy dependent translation according to at least one embodiment in which an object travels through a fluid. The object 1602 has a leading edge 1604 from which a gas 1606 streams. The object 1602 has a trailing edge 1610 from which a gas 1612 streams. The gas streams are illustrated as emanating from the interior of the object 1602 through respective leading and trailing injectors. The gas streams may reduce drag as the object translates through a surrounding fluid 1614. The object 1602 may be utilized in various embodiments of energy devices and density engines described herein with reference to, for example, FIGS. 4-8, 10 and 13-14 without excluding other drawings and descriptions herein. By providing a gas stream at either a leading edge, or a trailing edge, or both, resistive drag forces may be reduced as the object 1602 travels through a fluid. The leading edge gas 1606 stream and the trailing edge gas 1612 stream may provide thrust for moving the object 1602, which may move unidirectionally, multidirectionally, rotationally, vertically, horizontally, uniformly, intermittently, or vibrationally. By change of direction of the movement of the object 1602, the leading and trailing edges 1604 and 1610 may exchange their roles such that leading and trailing are only nominal and tentative distinctions. For example, either the edge 1604 or the trailing edge 1610 may be the upper edge of the object 1602 in FIG. 16.

In FIG. 16, a super low friction material 1616 defines the outer surface of the object 1602 to further reduce resistive drag forces as the object 1602 travels through a fluid. Such low-friction surfacing may be applied to other embodiments described herein.

Figure 17:
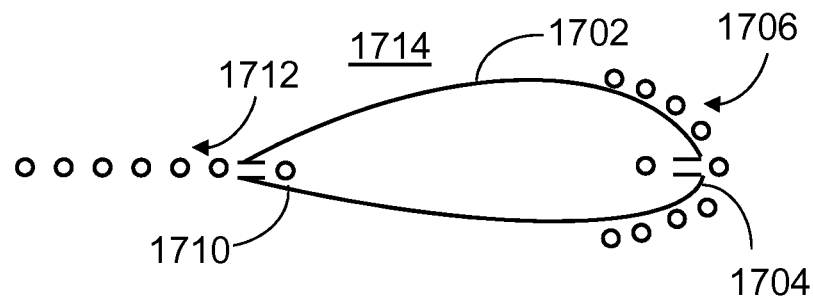
FIG. 17 depicts another object having leading and trailing edge gas streams according to at least one embodiment.

FIG. 17 depicts an object 1702 configured for travel through a fluid. The object 1702 has a leading edge 1704 from which a gas 1706 streams. The object 1702 has a trailing edge 1710 from which a gas 1712 streams. The gas streams are illustrated as emanating from the interior of the object 1702 through respective leading and trailing injectors. The gas streams may reduce drag as the object translates through a surrounding fluid 1714. The object 1702 may be utilized in various embodiments of energy devices and density engines described herein with reference to, for example, blade 916 in FIG. 9, without excluding other drawings and descriptions herein. By providing a gas stream at either a leading edge, or a trailing edge, or both, resistive drag forces may be reduced as the object 1702 travels through a fluid. The leading edge gas 1706 stream and the trailing edge gas 1712 stream may provide thrust for moving the object 1702, which may move unidirectionally, multidirectionally, rotationally, vertically, horizontally, uniformly, intermittently, or vibrationally. By change of direction of the movement of the object 1702, the leading and trailing edges 1704 and 1710 may exchange their roles such that leading and trailing are only nominal and tentative distinctions. The object 1702 is illustrated as having different contours along two opposing sides between the edges 1704 and 1710. As such, some degree of aerodynamic/hydrodynamic lift may result from movement of the object 1702 through the fluid 1714.

In at least one embodiment, advantages in wastewater treatment are derived from algae production. Wastewater treatment algaes are extremely effective at removing pathogens, phosphorus, nitrogen and other hazardous wastes and at the same time they produce minimal sludge. Aeration is an energy intensive cost accounting for more than 50% of traditional waste treatment. Algae produces $O_2$ as a by-product and provides a catalyst for waste consuming bacteria that sewage treatment typically requires. A buoyancy based power production facility, such as a density engine facility, can provide $CO_2$ saturated water for algae growth while utilizing the potential energy of $CO_2$ expansion for facility power requirements. Thus, density-engine based power may solve or mitigate the economic roadblocks of infrastructure costs, maintenance, harvesting and biomass valorization.

Greenhouse gas emissions are reduced even though additional $CO_2$ is used to facilitate accelerated algae growth. In at least one embodiment, a density engine facility and an algae facility are consolidated as a unified ecologically favorable enterprise in which algae consumes more $CO_2$ than the density engine facility releases making the entire system carbon negative. Algae biomass can provide additional revenues from the diverse products it can produce. Density engine technology can provide the economic and electrical resources to sequester carbon while providing a sustainable and profitable solution.

Sewage treatment is facilitated in at least one embodiment by generating power onsite and using density engine facility effluent to feed algae stock promoting $O_2$ output for aerobic bacteria reducing any need for electricity intensive mixing. Minimal sludge is output reducing costs and environment impact with regard to waste transportation such as by truck, and with regard to waste sites such as landfills. High protein feed for livestock is also produced.

In at least one embodiment, a density engine based power facility is situated over a high pressure natural gas well. Gas is collected after electricity is produced by the rising gas. A density engine based power facility can also be used for power generation while cleaning contaminants from gases like dirty $CO_2$ at storage sites. In such examples, a cleaning fluid may be used as the liquid in a density engine.

Heat exchangers may be used in conjunction with density engine based power production. Density engines deliver heat upon fluid condensation and a cryogenic component upon gas expansion and release. Thus, heat exchange benefits toward to heating and cooling can be provided by density engine based power production.

Density waves, density fluctuations, and other buoyancy and density effects have been described herein as resulting from injection of low density fluid, such as a gas, into a higher density host fluid, such as water. However, density fluctuations controlled by other causative physical processes are within the scope of these descriptions throughout. In various embodiments of a density engine, in lieu of or in combination with other embodiments described herein elsewhere, density is varied to impart buoyancy effects according to: temperature differentials; sound waves; natural occurring gas expulsion at high pressure; vibration induced differentials; chemical barriers; and density differentials caused by chemical reactions.

Figure 18:
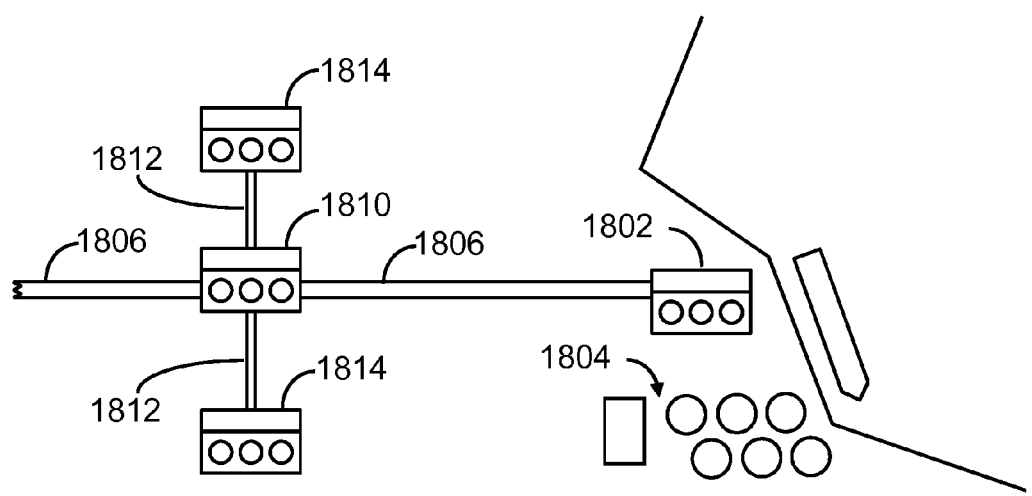
FIG. 18 depicts density engine based electrical energy production from gas decompression at multiple pressure step-down points in a gas distribution network.

In at least one embodiment as represented in FIG. 18, one or more density engine power facilities are co-located respectively with one or more liquid natural gas (LNG) facilities. For example, a first density engine power facility 1802 produces electrical energy from gas decompression from a shipping and refinery facility 1804 where natural gas is decompressed from its liquid state in a 1/600 ratio for distribution along a high-pressure pipeline 1806. A second density engine power facility 1810 receives high-pressure gas along the pipeline 1806 and further distributes the gas along lower-pressure pipelines 1812. Further decompression and distribution is further represented by third density engine power facilities 1814 linked to the second facility 1810 by the lower-pressure pipelines 1812. As such, in FIG. 18, electrical energy is produced from gas decompression at multiple pressure step-down points in a gas distribution network. For example, gas in the high-pressure pipelines 1806 may have a pressure in the 1500-200 psi range, and gas in the lower pressure pipeline branches 1812 may have gas in the 200 to 0.25 psi range.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A density engine comprising:
a chamber containing a host liquid having a first density;
an object movably positioned in the host liquid and having a second density less than the first density such that the object is buoyant in the host liquid;
an injector that intermittently injects bursts of a gas into the chamber below the object, each burst of the gas thereby creating a respective rising fluid region including a portion of the gas and a portion of the host liquid, each rising fluid region having a density that is less than the second density such that the object is not buoyant in said each rising fluid region, wherein said each rising fluid region intermittently passes the object thereby causing oscillatory motion of the object; and
an electrical generator coupled to the object, and upon the oscillatory motion of the object as said rising fluid region intermittently passes the object, the electrical generator generates electricity.

2. A density engine according to claim 1, wherein the object comprises multiple objects at respective vertical positions within the host liquid, each of the multiple objects is movably positioned and said each of the multiple objects having a density less than the first density and greater than the second density.

3. A density engine according to claim 1, further comprising a storage facility in fluid communication with the injector to provide the gas for injection.

4. A density engine according to claim 3, further comprising a fuel combustion facility that provides the gas to the storage facility.

5. A density engine according to claim 1, further comprising a collector in fluid communication with the chamber to receive the gas emanating from a top surface of the host liquid after the gas rises through the host liquid.

6. A density engine according to claim 5, further comprising a storage facility in fluid communication with the collector to sequester the gas received by the collector.

7. A density engine according to claim 6, further comprising a biofuel stock that is fed with the gas from the storage facility.

8. A density engine according to claim 1, wherein the gas injected into the chamber by the injector comprises carbon dioxide.

9. A system comprising:
a fuel combustion facility that provides a gas: and
a density engine comprising:
a chamber containing a host liquid having a first density;
an object movably positioned in the host liquid and having a second density less than the first density such that the object is buoyant in the host liquid;
an injector that intermittently injects bursts of the gas into the chamber below the object, each burst of the gas thereby creating a respective rising fluid region including a portion of the gas and a portion of the host liquid, each rising fluid region having a third density that is less than the second density such that the object is not buoyant in said rising fluid region; and
an electrical generator coupled to the object, and upon the oscillatory motion of the object as said each rising fluid region intermittently passes the object, the electrical generator generates electricity.

10. A system according to claim 9, wherein the gas comprises carbon dioxide.

11. A system according to claim 9, further comprising a storage facility through which the fuel combustion facility provides the gas to the density engine.

12. A system according to claim 9, further comprising:
a collector in fluid communication with the chamber, the collector configured to receive the gas from the density engine after the gas rises through the host liquid; and
a storage facility in fluid communication with the collector, the storage facility configured to store the gas from the collector.

13. A system according to claim 9, further comprising at least one of a windmill and a solar collector providing energy to compress the gas for the injector.

14. A system according to claim 9, further comprising a biofuel stock, wherein the gas is exited from the density engine and is used to feed the biofuel stock.

15. A system according to claim 14, wherein the biofuel stock comprises algae.

16. An energy production system comprising:
a chamber containing a host liquid having a first density;
an object movably positioned in the host liquid and having a second density less than the first density such that the object is buoyant in the host liquid;
an injector that intermittently injects bursts of a gas into the chamber below the object, each burst of the gas thereby creating a respective rising fluid region including a portion of the gas and a portion of the host liquid, each rising fluid region having a third density that is less than the second density such that the object is not buoyant in said each rising fluid region, wherein said each rising fluid region, intermittently passes the object thereby causing oscillatory motion of the object;
an electrical generator coupled to the object, and upon the oscillatory motion of the object as said rising fluid region intermittently passes the object, the electrical generator generates electricity; and
at least one of a windmill, a solar collector, and a fossil fuel plant providing energy to compress the gas for the injector.

* * * * *